US008556729B2

(12) United States Patent
Suzuki et al.

(10) Patent No.: US 8,556,729 B2
(45) Date of Patent: Oct. 15, 2013

(54) VIDEO GAME SYSTEM AND STORAGE MEDIUM STORING VIDEO GAME PROGRAM

(75) Inventors: Ichiro Suzuki, Kyoto (JP); Yusuke Shiraiwa, Kyoto (JP); Katsuhisa Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 971 days.

(21) Appl. No.: 11/446,968

(22) Filed: Jun. 6, 2006

(65) Prior Publication Data

US 2007/0078004 A1    Apr. 5, 2007

(30) Foreign Application Priority Data

Oct. 4, 2005  (JP) ................................. 2005-291639

(51) Int. Cl.
*A63F 9/24*     (2006.01)
*G06F 13/00*    (2006.01)

(52) U.S. Cl.
USPC ................ 463/43; 463/11; 455/426; 345/426

(58) Field of Classification Search
USPC ...................................................... 463/40–44
See application file for complete search history.

(56) References Cited

U.S. PATENT DOCUMENTS

| 7,336,276 | B2* | 2/2008 | Ishihata et al. ................. 345/426 |
| 2002/0061743 | A1* | 5/2002 | Hutcheson et al. ............ 455/426 |
| 2003/0171142 | A1* | 9/2003 | Kaji et al. ........................ 463/11 |
| 2004/0212729 | A1* | 10/2004 | Yamaguchi et al. ........ 348/387.1 |

FOREIGN PATENT DOCUMENTS

| JP | 7-213744 | 8/1995 |
| JP | 2005-237648 | 9/2005 |

OTHER PUBLICATIONS

"Mario Kart: Double Dash!! Instruction Booklet" Retrieved from replacementdocs.com <http://www.replacementdocs.com/request.php?2013>. Release date: Nov. 17, 2003 as evidenced by wikipedia.*
"Mario Kart: Double Dash!!" Retrieved from wikipedia.com as evidence for release date of the game <http://en.wikipedia.org/w/index.php?title=Mario_Kart:_Double_Dash!!&printable=yes>.*
"Mario Kart: Double Dash!!" Retrieved from wikipedia.com as evidence for release date of the game <http://en.wikipedia.org/w/index.ph p?title=Mario_Kart:_Double_Dash !!&printable=yes>. last accessed Oct. 31, 2008.*
"Mario Kart DS (tentative)." "Dengeki Game Cube January Issue," MediaWorks Inc., Jan. 1, 2005, vol. 5 No. 2, p. 44 (with partial translation).
"Official Nintendo Player's Guide Mario Kart: Double Dash!!," Shogakukan Inc., Jan. 10, 2004, First edition, First copy, p. 6, 21. (with partial translation).

* cited by examiner

*Primary Examiner* — Paul A D'Agostino
(74) *Attorney, Agent, or Firm* — Nixon & Vanderhye, P.C.

(57) ABSTRACT

In response to a predetermined input operation by a player, item object initial information is produced. The item object initial information is information used for introducing an item object into a virtual game world and controlling the item object in the virtual game world. Then, the item object is introduced into the virtual game world, and controlled in the virtual game world according to a predetermined rule. The item object initial information is transmitted to other video game devices. Each of the other video game devices receives the item object initial information, based on which the video game device introduces the item object into the virtual game world and then controls the item object in the virtual game world according to a predetermined rule.

20 Claims, 14 Drawing Sheets

FIG. 13

| FRAME# | GAME DEVICE 1A | GAME DEVICE 1B | GAME DEVICE 1C | GAME DEVICE 1D | EVENT |
|---|---|---|---|---|---|
| 100 | | | | | DATA TRANSMITTED FROM 1A TO 1B, 1C, 1D |
| 101 | UPDATE ITEM POSITION 1 TIME | | | | |
| 102 | UPDATE ITEM POSITION 1 TIME | | | | |
| 103 | | | | | |
| 104 | | | | | |
| 105 | | | | | |
| 106 | | | | | |
| 107 | | | | | |
| 108 | | | | | |
| 109 | | | | | |
| 110 | | | | | |
| 111 | | | | | |
| 112 | | | | | |
| 113 | | | | | |
| 114 | | | | | |
| 115 | | | | | |
| 116 | | | | | 1B RECEIVES DATA FROM 1A |
| 117 | | UPDATE ITEM POSITION 10 TIMES | | | |
| 118 | | UPDATE ITEM POSITION 3 TIMES | | | |
| 119 | | UPDATE ITEM POSITION 3 TIMES | | | |
| 120 | | UPDATE ITEM POSITION 2 TIMES | | | 1D RECEIVES DATA FROM 1A |
| 121 | | UPDATE ITEM POSITION 2 TIMES | | UPDATE ITEM POSITION 12 TIMES | |
| 122 | | UPDATE ITEM POSITION 2 TIMES | | UPDATE ITEM POSITION 3 TIMES | ITEM POSITION OF 1B IN SYNC WITH 1A |
| 123 | | UPDATE ITEM POSITION 1 TIME | | UPDATE ITEM POSITION 3 TIMES | |
| 124 | | UPDATE ITEM POSITION 1 TIME | | UPDATE ITEM POSITION 3 TIMES | |
| 125 | | | | UPDATE ITEM POSITION 2 TIMES | |
| 126 | | | | UPDATE ITEM POSITION 2 TIMES | |
| 127 | | | | UPDATE ITEM POSITION 2 TIMES | ITEM POSITION OF 1D IN SYNC WITH 1A |
| 128 | | | | UPDATE ITEM POSITION 1 TIME | |
| 129 | | | | UPDATE ITEM POSITION 1 TIME | |
| 130 | | | | | 1C RECEIVES DATA FROM 1A |
| 131 | | | UPDATE ITEM POSITION 17 TIMES | | |
| 132 | | | UPDATE ITEM POSITION 3 TIMES | | |
| 133 | | | UPDATE ITEM POSITION 3 TIMES | | |
| 134 | | | UPDATE ITEM POSITION 3 TIMES | | |
| 135 | | | UPDATE ITEM POSITION 3 TIMES | | |
| 136 | | | UPDATE ITEM POSITION 3 TIMES | | |
| 137 | | | UPDATE ITEM POSITION 3 TIMES | | |
| 138 | | | UPDATE ITEM POSITION 2 TIMES | | |
| 139 | | | UPDATE ITEM POSITION 2 TIMES | | ITEM POSITION OF 1C IN SYNC WITH 1A |
| 140 | | | UPDATE ITEM POSITION 1 TIME | | |
| 141 | | | UPDATE ITEM POSITION 1 TIME | | |
| 142 | | | | | |
| 143 | | | | | |
| 144 | | | | | |
| 145 | | | | | |
| 146 | | | | | |
| 147 | | | | | |
| 148 | ↓ | ↓ | ↓ | ↓ | |

VIDEO GAME SYSTEM AND STORAGE MEDIUM STORING VIDEO GAME PROGRAM

CROSS REFERENCE TO RELATED APPLICATION

The disclosure of Japanese Patent Application No. 2005-291639 is incorporated herein by reference.

BACKGROUND OF THE INVENTION

1. Field of the Invention

The present invention relates to a video game system and a storage medium storing a video game program and, more particularly, to a video game system including a plurality of video game devices capable of communicating with one another via a communications network and a storage medium storing a video game program to be executed by such video game devices.

2. Description of the Background Art

In the prior art, Japanese Laid-Open Patent Publication No. 7-213744 (hereinafter "Patent Document 1"), for example, discloses a video game played between a plurality of video game devices capable of communicating with one another via a communications network. In the video game system disclosed in Patent Document 1, a plurality of independent video game devices are connected together via a data transmission line such that data can be exchanged therebetween. The player of each video game device can play a multi-player video game with the players of the other video game devices in a common game space by looking at the game screen on the display. As the synchronization control operation is performed for the synchronization between the video game devices, a synchronized game screen is displayed on the display of each video game device. Therefore, the game screen can be naturally displayed to the players of the video game devices.

However, where data are exchanged between a plurality of video game devices via a communications network, the amount of time required for the data transmission/reception varies from one device to another depending on the communications environment. For example, the data communication speed of a system where independent video game devices are adjacently placed together and connected together via a wired data transmission line, as shown in the preferred embodiment section of Patent Document 1, is clearly higher than that of a system of a type that is rapidly becoming popular where the video game devices are connected together via a network such as the Internet. In other words, it takes more time for data to be transmitted/received between video game devices that are connected together via the Internet than between video game devices that are connected together as shown in the preferred embodiment section of Patent Document 1. Thus, for the same amount of data, it takes longer to transmit/receive the data if the data is transmitted/received via a network, thereby making it difficult to synchronize the video game devices. Moreover, as more data need to be transmitted/received for the purpose of synchronization, it makes even more difficult to control the system.

SUMMARY OF THE INVENTION

Therefore, an object of an embodiment of the present invention is to provide a video game system and a storage medium storing a video game program capable of accommodating an increase in the transmission/reception time in a video game played between a plurality of video game devices connected together via a communications network.

Note that reference numerals, step numbers (each including "S" followed by a number), etc., shown in parenthesis below are merely to indicate the correlation between what is described in the following section and what is described in the description of the preferred embodiment set out further below in the present specification, and are in no way intended to restrict the scope of the present invention.

A first aspect of the of the system disclosed herein is directed to a video game system including a plurality of video game devices (1A to 1D) connected together so that the video game devices can communicate with one another. The video game devices display the same virtual game world while being synchronized together, the virtual game world including therein player characters (PA to PD) each controlled by one of the video game devices. A first video game device (1A) being one of the plurality of video game devices includes communications means (33), first player character operation controlling means (S50), first player character information transmitting means (S50), item object initial information production means (S52), item object operation controlling means (S59 to S62, S73 to S83), and item object information transmitting means (S53). The communications means is means for exchanging data with other video game devices (PB to PD). The first player character operation controlling means is means for controlling a first player character (PA) in the virtual game world in response to a player's input operation. The first player character information transmitting means is means for transmitting first player character information (D5) regarding an operation of the first player character to the other video game devices via the communications means at regular intervals. The item object initial information production means is means for producing item object initial information (D4) used for introducing an item object (I), different from the first player character, into the virtual game world and for controlling the item object in the virtual game world, in response to a predetermined input operation by the player. The item object operation controlling means is means for controlling item object according to a predetermined rule after introducing the item object into the virtual game world based on the item object initial information. The and item object information transmitting means is means for transmitting the item object initial information to other video game devices via the communications means. The second video game device (PB) being another one of the plurality of video game devices different from the first video game device includes: communications means, first player character information receiving means (S50), first player character synchronization means (S50), item object information receiving means (S54), and item object operation controlling means (S59 to S62, S73 to S83). The communications means is means for exchanging data with other video game devices (PA, PC, PD). The first player character information receiving means is means for receiving the first player character information from the first video game device via the communications means. The first player character synchronization means is means for controlling the first player character in the virtual game world represented by the second video game device based on the first player character information. The item object information receiving means is means for receiving the item object initial information from the first video game device via the communications means. The item object operation controlling means is means for controlling the item object according to a predetermined rule after introducing the item object into the virtual game world represented by the second video game device based on the item object initial information.

According to a second aspect, in the first aspect, the item object initial information production means produces the item object initial information so as to include introduction time information (D3) indicating a time at which the item object is introduced into the virtual game world. The item object operation controlling means of the second video game device calculates a delay time (D4e) of the virtual game world represented by the second video game device with respect to the virtual game world represented by the first video game device based on the introduction time information included in the item object initial information, and determines a position at which the item object is to be introduced into, and controlled in, the virtual game world represented by the second video game device according to the delay time.

According to a third aspect, in the second aspect, when new item object initial information is obtained, the item object operation controlling means of the second video game device introduces the item object based on a position of the first player character controlled by the first player character synchronization means in the virtual game world represented by the second video game device.

According to a fourth aspect, in the third aspect, the item object initial information production means produces the item object initial information so as to further include position information representing a position at which the item object is introduced into the virtual game world. The item object operation controlling means of the second video game device repeats updating the position of the item object using the item object initial information so as to introduce the item object at a position closest to the first player character controlled by the first player character synchronization means.

According to a fifth aspect, in the third aspect, the item object initial information production means produces the item object initial information so as to further include position information (D4b) representing a position at which the item object is introduced into the virtual game world. The item object operation controlling means of the second video game device calculates a travel time required for moving the item object from a position in the virtual game world represented by the position information included in the item object initial information to the position at which the item object is introduced, and updates the delay time by subtracting the travel time from the delay time.

According to a sixth aspect, in the first aspect, the second video game device further includes second player character operation controlling means (S50) and second player character information transmitting means (S50). The second player character operation controlling means is means for controlling a second player character (PB) in the virtual game world represented by the second video game device in response to a player's input operation. The second player character information transmitting means is means for transmitting second player character information (D5) regarding an operation of the second player character to the other video game devices via the communications means at regular intervals. The first video game device further includes second player character information receiving means (S50) and second player character synchronization means (S5). The second player character information receiving means is means for receiving the second player character information from the second video game device via the communications means. The second player character synchronization means is means for controlling the second player character in the virtual game world represented by the first video game device based on the second player character information. When a distance between the second player character controlled by the second player character synchronization means and the item object in the virtual game world becomes within a predetermined range (AB), the item object operation controlling means of the first video game device determines the second player character to be a target object of the item object, and controls the item object so as to follow the second player character. The item object information transmitting means transmits target information indicating the target object of the item object to other video game devices via the communications means (S62). The item object information receiving means of the second video game device receives the target information from the first video game device via the communications means (S71). The item object operation controlling means of the second video game device controls the item object so as to follow the second player character controlled by the second player character operation controlling means in the virtual game world based on the target information.

According to a seventh aspect, in the sixth aspect, the item object operation controlling means of the second video game device controls the item object so as to follow the second player character at a first speed. The item object operation controlling means of the first video game device controls the item object so as to follow the second player character at a second speed lower than the first speed.

According to an eighth aspect, in the first aspect, the second video game device further includes second player character operation controlling means, second player character information transmitting means, collision detection means (S75), and collision information transmitting means (S78). The second player character operation controlling means is means for controlling a second player character in the virtual game world represented by the second video game device in response to a player's input operation. The second player character information transmitting means is means for transmitting second player character information regarding an operation of the second player character to the other video game devices via the communications means at regular intervals. The collision detection means is means for detecting, only for the second player character, a collision with the item object in the virtual game world represented by the second video game device. The collision information transmitting means is means for transmitting collision information indicating a collision between the second player character and the item object to the other video game devices via the communications means. The first video game device further includes second player character information receiving means, second player character synchronization means, and collision information receiving means (S79). The second player character information receiving means is means for receiving the second player character information from the second video game device via the communications means. The second player character synchronization means is means for controlling the second player character in the virtual game world represented by the first video game device based on the second player character information. The collision information receiving means is means for receiving the collision information from the second video game device via the communications means. The second player character synchronization means of the first video game device shows the second player character and the item object colliding with each other in the virtual game world represented by the first video game device based on the collision information (S80).

A ninth aspect is directed to a storage medium storing a video game program to be executed by a computer (21) of each of a plurality of video game devices connected together so that the video game devices can communicate with one another, wherein the video game devices display the same virtual game world while being synchronized together, the virtual game world including therein player characters each controlled by one of the video game devices. The video game program causes the computer to function as subject player character operation controlling means, subject player character information transmitting means, item object initial information production means, item object operation controlling means, item object information transmitting means, non-subject player character information receiving means, non-subject player character synchronization means, and item object information receiving means. The subject player character operation controlling means is means for controlling a subject player character in the virtual game world in response to a player's input operation. The subject player character information transmitting means is means for transmitting subject player character information regarding an operation of the subject player character to the other video game devices at regular intervals. The item object initial information production means is means for producing item object initial information used for introducing an item object, different from the subject player character, into the virtual game world and for controlling the item object in the virtual game world, in response to a predetermined input operation by the player. The item object operation controlling means is means for controlling the item object according to a predetermined rule after introducing the item object into the virtual game world based on the item object initial information produced by the item object initial information production means. The item object information transmitting means is means for transmitting the item object initial information to the other video game devices. The non-subject player character information receiving means is means for receiving non-subject player character information regarding an operation of non-subject player character controlled by one of the other video game devices from the one of the other video game devices at regular intervals. The non-subject player character synchronization means is means for controlling the non-subject player character in the virtual game world based on the non-subject player character information. The item object information receiving means is means for receiving the item object initial information from one of the other video game devices in response to a predetermined input operation by a player of the one of the other video game devices. When the item object initial information is received from the one of the other video game devices, the item object operation controlling means introduces an item object into the virtual game world and then controls the item object in the virtual game world according to a predetermined rule.

According to a tenth aspect, in the ninth aspect, the item object initial information transmitted from one of the other video game devices includes introduction time information indicating a time at which the item object is introduced into the virtual game world in the one of the other video game devices. When the item object initial information is received from the one of the other video game devices, the item object operation controlling means calculates a delay time of the virtual game world represented by the subject device with respect to the virtual game world represented by the one of the other video game devices based on the introduction time information included in the item object initial information, and determines a position at which the item object is to be introduced into, and controlled in, the virtual game world according to the delay time.

According to an eleventh aspect, in the tenth aspect, when the item object initial information is received from the one of the other video game devices, the item object operation controlling means introduces the item object based on a position of the non-subject player character controlled by the non-subject player character synchronization means in the virtual game world.

According to a twelfth aspect, in the eleventh aspect, the item object initial information transmitted from the one of the other video game devices further includes position information representing a position at which the item object is introduced into the virtual game world. The item object operation controlling means repeats updating the position of the item object using the item object initial information received from the one of the other video game devices so as to introduce the item object at a position closest to the non-subject player character controlled by the non-subject player character synchronization means.

According to a thirteenth aspect, in the eleventh aspect, the item object initial information transmitted from the one of the other video game devices further includes position information representing a position at which the item object is introduced into the virtual game world. When the item object initial information is received from the one of the other video game devices, the item object operation controlling means calculates a travel time required for moving the item object from a position in the virtual game world represented by the position information included in the item object initial information to the position at which the item object is introduced, and updates the delay time by subtracting the travel time from the delay time.

According to a fourteenth aspect, in the ninth aspect, where the item object is introduced into the virtual game world in response to a predetermined input operation by a player on a subject device, when a distance between the non-subject player character and the item object becomes within a predetermined range, the item object operation controlling means determines the non-subject player character to be a target object of the item object, and controls the item object so as to follow the non-subject player character. The item object information transmitting means transmits target information indicating the target object of the item object to other video game devices. Where the item object is introduced into the virtual game world in response to a predetermined input operation by a player on one of the other video game devices, the item object information receiving means receives target information indicating that the target object is determined by the one of the other video game devices. The item object operation controlling means controls the item object so as to follow a player character that is specified as the target object by the target information in the virtual game world based on the target information received from the one of the other video game devices.

According to a fifteenth aspect, in the fourteenth aspect, when the target object specified by the target information transmitted from the one of the other video game devices is the subject player character, the item object operation controlling means controls the item object so as to follow the subject player character at a first speed. When the target object determined by the subject device is the non-subject player character, the item object operation controlling means controls the item object to follow the non-subject player character at a second speed being lower than the first speed.

According to a sixteenth aspect, in the ninth aspect, the video game program causes the computer to further function as collision detection means, collision information transmitting means, and collision information receiving means. The collision detection means is means for detecting, only for the subject player character, a collision with the item object in the virtual game world. The collision information transmitting means is means for transmitting collision information indicating a collision between the subject player character and the item object to the other video game devices. The collision information receiving means is means for receiving the collision information indicating a collision between the non-subject player character and the item object from one of the other video game devices. The non-subject player character synchronization means shows the non-subject player character and the item object colliding with each other in the virtual game world based on the collision information received from the one of the other video game devices.

According to the first aspect, there is provided a video game played via a communications network by using initial information regarding an item object that the player can control only when introducing the item object into the game space, wherein the initial information introduced by the player of a video game device is transmitted to other video game devices only when the item object is introduced into the game space, based on which each video game device performs a calculation operation and a display control operation. Therefore, it is possible to reduce the amount of data to be transmitted, as compared with a case where such object information is frequently transmitted to the other video game devices even after the object is introduced into the game space. As the average amount of data per one data transmission is decreased, it is possible to shorten the data transmission time for the same communications environment. In other words, under inferior communications environments, it is possible to prevent the data transmission time from becoming long.

According to the second aspect, after the initial information regarding the item object is received, the item object is controlled based on the delay time with respect to the transmitting device. Therefore, it is possible to synchronize the transmitting and receiving video game devices with one another by performing an operation such that the delay time is decreased to. Thus, after an item object is introduced into the game space, the video game devices are synchronized with one another through adjustment of the update count in the game process, or the like, whereby it is possible to realize a game image that causes no awkwardness to the players of the video game devices.

According to the third aspect, when the item object is introduced into the virtual game world by the first video game device, the item object will appear in a natural manner on the other video game devices based on the position of the player character controlled by the first video game device.

According to the fourth aspect, when the item object is introduced into the virtual game world by the first video game device, the item object will appear in a natural manner on the other video game devices at a position closest to the player character controlled by the first video game device.

According to the fifth aspect, the transmitting and receiving video game devices can be synchronized with one another while controlling the item object to appear in a natural manner at the position of the player character that has introduced the item object.

According to the sixth aspect, there is provided a video game played via a communications network, wherein information regarding an item object is transmitted to other video game devices only when the item object is introduced into the game space and when the status thereof is changed (when the target object is determined). Therefore, it is possible to reduce the amount of data to be transmitted, as compared with a case where such object information is frequently transmitted to the other video game devices even after the object is introduced into the game space. As the average amount of data per one data transmission is decreased, it is possible to shorten the data transmission time for the same communications environment. In other words, under inferior communications environments, it is possible to prevent the data transmission time from becoming long. By limiting the video game device that changes the status of the item object and transmitting the target information thereof to a video game device that has introduced the item object, it is possible to avoid possible discrepancies in the game play, which may occur with respect to those changes.

According to the seventh aspect, there is provided the following advantage. In a video game system that requires time for transmitting/receiving data between video game devices, the "target-following time", i.e., the amount of time from when an item object is introduced into the game space until the item object catches up with the target object, varies between a video game device that determines the target object and a video game device that controls the target object. Typically, the video game device that determines the target object will have the longest target-following time, and the video game device that controls the target object will have the shortest target-following time. Since the speed of the item object is adjusted based on the length of the target-following time, it is possible to avoid possible discrepancies in the game play between various video game devices with respect to the positional relationship between the target object and the item object.

According to the eighth aspect, by limiting the object of collision detection with the item object to the player character controlled by the subject device, it is possible to avoid discrepancies in the game play, which may occur with respect to those changes.

With the storage medium storing a video game program of the present invention, the video game program is executed by the computer of each video game device, thereby realizing effects similar to those of the video game system set forth above.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 shows how the video game devices 1A to 1D are synchronized together by the process shown in FIGS. 9 to 11.

DESCRIPTION OF THE PREFERRED EMBODIMENTS

Figure 1:
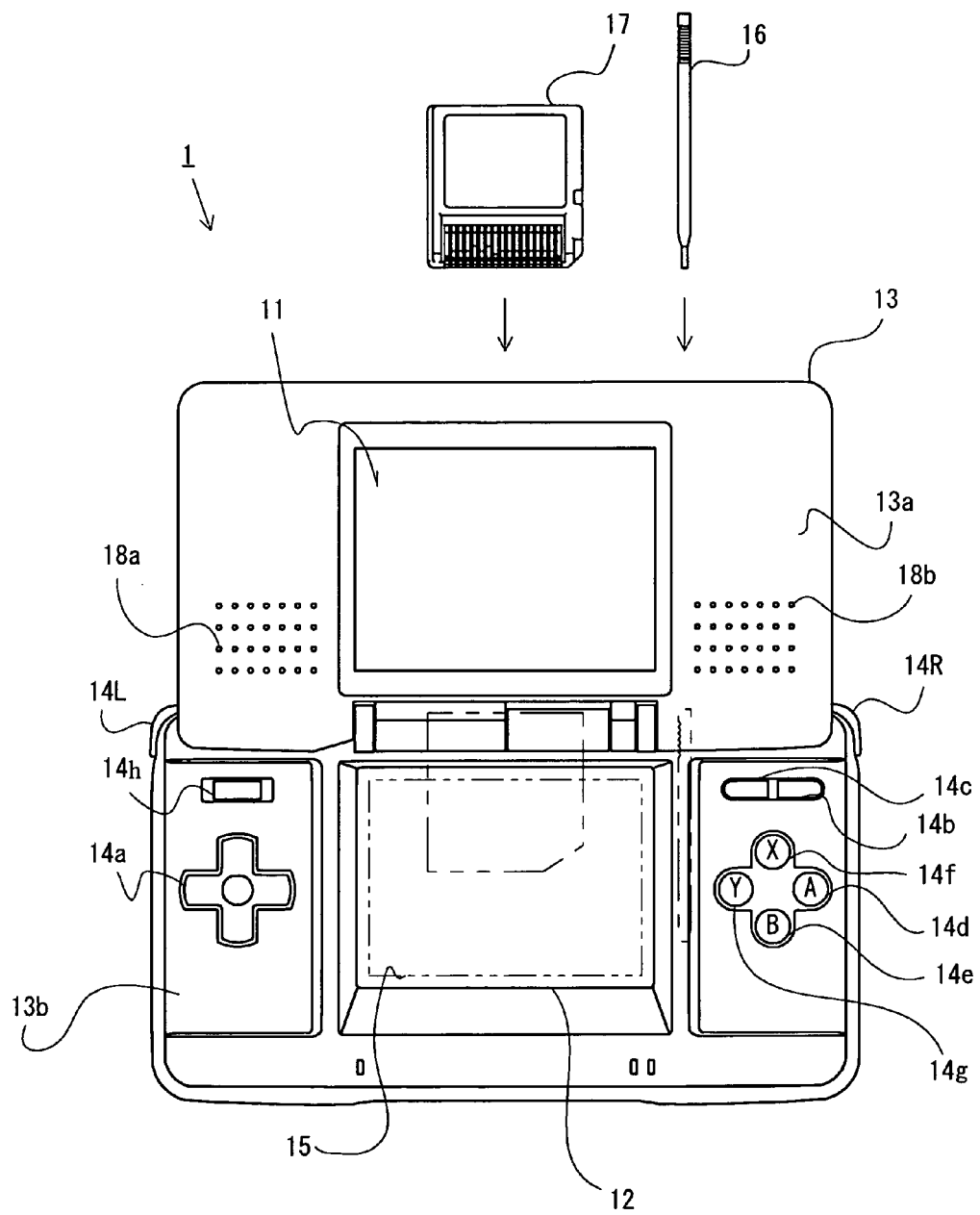
FIG. 1 shows an external view of a video game device 1 capable of executing a video game program according to an embodiment of the present invention.

A video game device capable of executing a video game program according to an embodiment of the present invention will now be described with reference to the drawings. While the video game program of the present invention can be executed under any computer system capable of communicating with other devices, the following description is directed to a video game program being executed by a video game device 1 (an example of an information processing device) capable of communicating with other devices. FIG. 1 shows an external view of the video game device 1 capable of executing the video game program of the present invention. Although the type of the video game device is not limited to any particular type, the video game device 1 herein is a portable video game device.

Referring to FIG. 1, the video game device 1 includes a first LCD (Liquid Crystal Display) 11 and a second LCD 12. A housing 13 includes an upper housing 13a accommodating the first LCD 11, and a lower housing 13b accommodating the second LCD 12. The first LCD 11 and the second LCD 12 both have a resolution of 256×192 dots. While LCDs are used in the present embodiment, the display device may be of any other suitable type, e.g., an EL (Electro Luminescence) display device. Moreover, the resolution of the first LCD 11 and the second LCD 12 is not limited to the particular resolution used herein.

The upper housing 13a includes sound slits 18a and 18b therein for allowing the sound from a pair of speakers (30a and 30b in FIG. 2) to be described later to pass therethrough.

The lower housing 13b includes a set of input devices, including a cross-shaped switch 14a, a start switch 14b, a select switch 14c, an A button 14d, a B button 14e, an X button 14f, a Y button 14g, a power switch 14h, an L button 14L and an R button 14R. Another input device is a touch panel 15 attached on the screen of the second LCD 12. The lower housing 13b includes slots for accommodating a memory card 17 and a stylus 16.

The touch panel 15 may be any of various types of touch-sensitive panels, including a resistive film touch panel, an optical (infrared) touch panel and a capacitance-coupling touch panel. The touch panel 15is an example of a pointing device capable of outputting position data corresponding to the contact point on the surface thereof, at which it is being touched with the stylus 16. While it is assumed herein that the user uses the stylus 16 to operate the touch panel 15, it is understood that the touch panel 15 may be operated with a pen (stylus pen) or a fingertip instead of the stylus 16. In the present embodiment, the touch panel 15 has a resolution (detection precision) of 256×192 dots, which is equal to the resolution of the second LCD 12. Note however that it is not necessary that the resolution of the touch panel 15 is equal to that of the second LCD 12. As will be apparent from the following description, the present invention can be realized without the provision of the touch panel 15 and the first LCD 11 in the video game device 1.

The memory card 17 is a storage medium storing the video game program, etc., and is received by the slot in the lower housing 13b.

Figure 2:
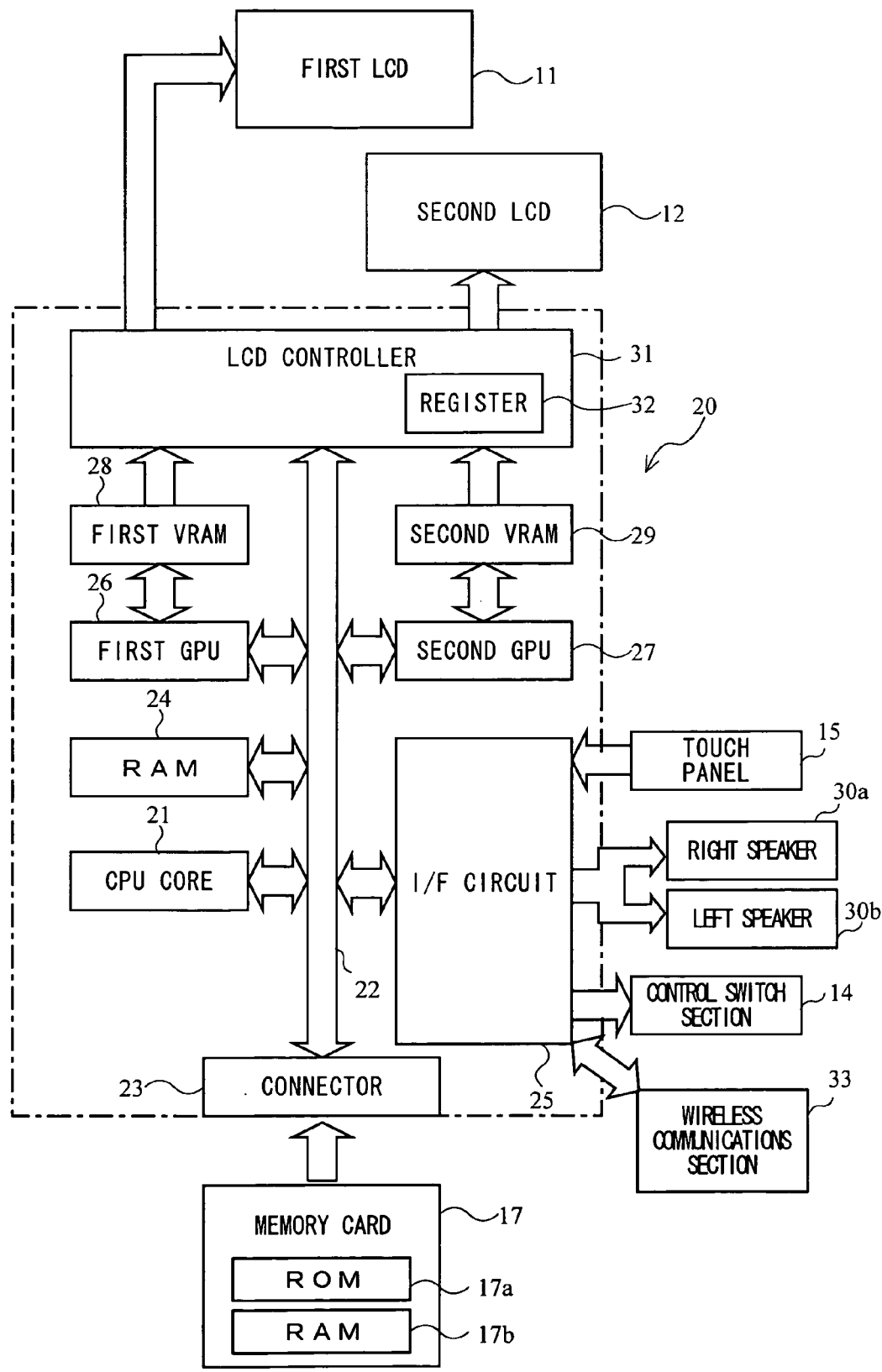
FIG. 2 is a block diagram showing an internal configuration of the video game device 1 of FIG. 1.

) Referring now to FIG. 2, an internal configuration of the video game device 1 will be described. FIG. 2 is a block diagram showing the internal configuration of the video game device 1.

Referring to FIG. 2, a CPU core 21 is mounted on an electronic circuit board 20 accommodated in the housing 13. The CPU core 21 is connected to a connector 23, an input/output interface circuit (referred to simply as an "I/F circuit") 25, a first GPU (Graphics Processing Unit) 26, a second GPU 27, a RAM 24 and an LCD controller 31, via a bus 22. The connector 23 can receive the memory card 17. The memory card 17 includes therein a ROM 17a storing a video game program, and a RAM 17b rewritably storing backup data. The video game program stored in the ROM 17a of the memory card 17 is loaded to the RAM 24, and the loaded video game program is executed by the CPU core 21. In addition to the video game program, the RAM 24 also stores temporary data produced while the CPU core 21 is running a program. The I/F circuit 25 is connected to the touch panel 15, a right speaker 30a, a left speaker 30b, a control switch section 14 of FIG. 1 including the cross-shaped switch 14a and the A button 14d, and a wireless communications section 33. The right speaker 30a and the left speaker 30b are placed behind the sound slits 18a and 18b, respectively.

A first VRAM (Video RAM) 28 is connected to the first GPU 26, and a second VRAM 29 is connected to the second GPU 27. In response to an instruction from the CPU core 21, the first GPU 26 produces a first display image and renders it on the first VRAM 28, based on data stored in the RAM 24 for producing display images. Similarly, the second GPU 27 produces a second display image and renders it on the second VRAM 29 in response to an instruction from the CPU core 21. The first VRAM 28 and the second VRAM 29 are connected to the LCD controller 31.

The LCD controller 31 includes a register 32. The register 32 stores a value of 0 or 1 in response to an instruction from the CPU core 21. When the value stored in the register 32 is 0, the LCD controller 31 outputs the first display image rendered on the first VRAM 28 to the first LCD 11 and outputs the second display image rendered on the second VRAM 29 to the second LCD 12. When the value stored in the register 32 is 1, the LCD controller 31 outputs the first display image rendered on the first VRAM 28 to the second LCD 12 and outputs the second display image rendered on the second VRAM 29 to the first LCD 11.

Figure 3:
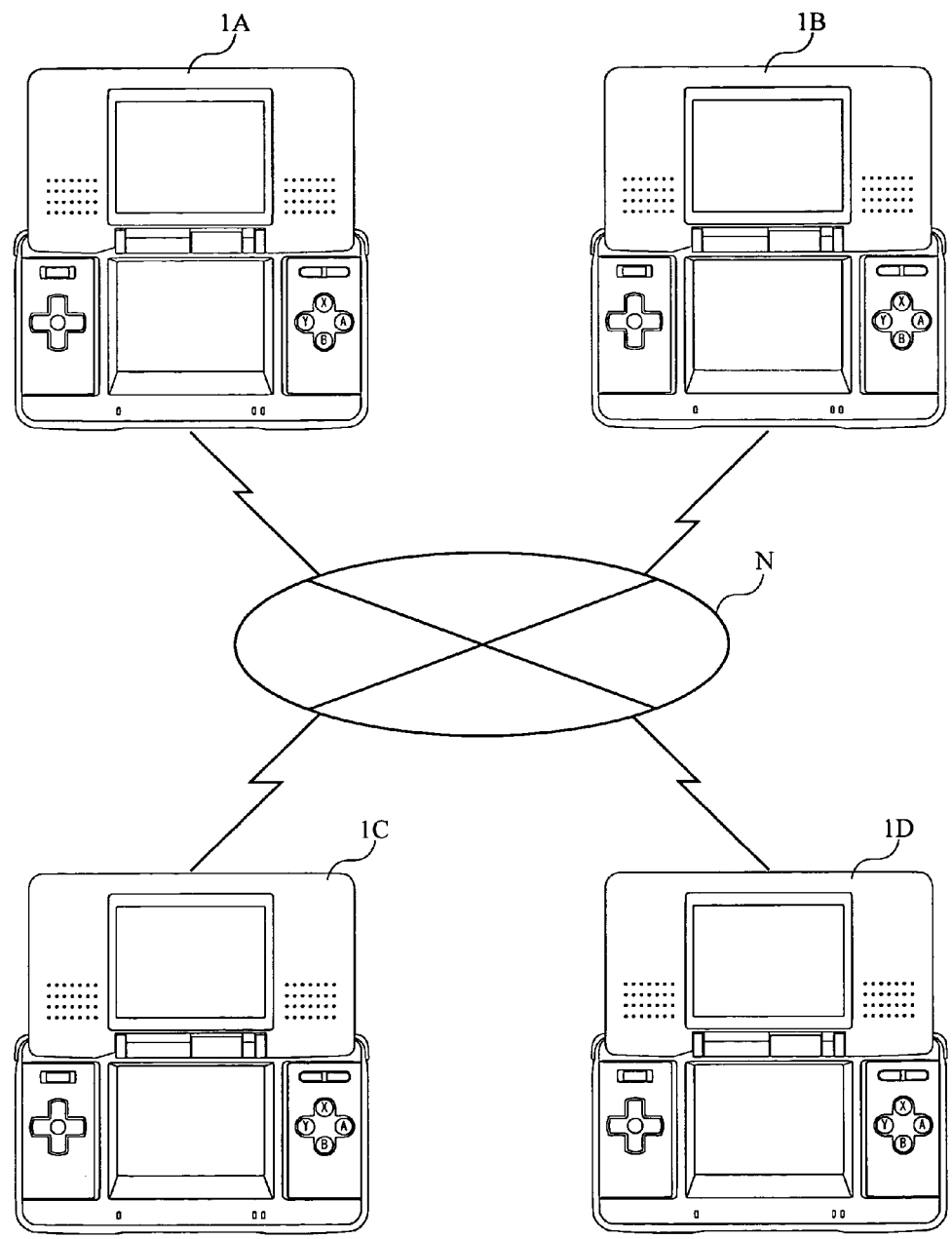
FIG. 3 shows a video game system according to an embodiment of the present invention.

The wireless communications section 33 exchanges data used in a game process or other data with that of another video game device, and provides a wireless communications function in compliance with the IEEE 802.11 wireless LAN standard, for example. The wireless communications section 33 outputs received data to the CPU core 21. The wireless communications section 33 transmits data to another video game device, as instructed by the CPU core 21. If a communications protocol such as TCP/IP (Transmission Control Protocol/Internet Protocol) and a predetermined browser are provided in the storage section inside the wireless communications section 33 or the video game device 1, the video game device 1 can be connected to a network such as the Internet via the wireless communications section 33. Then, the video game device 1 can wirelessly communicate with other video game devices via a network. For example, a plurality of video game devices 1A to 1D are connected together via a network N so that the video game devices 1A to 1D can communicate with one another to form a video game system, as shown in FIG. 3. Typically, all of the video game devices 1A to 1D are the same video game device, and will hereinafter be referred to also collectively as "the video game device 1".

Note that the video game program of the present invention may be supplied to the computer system via a wired or wireless communications line, instead of via an external storage medium such as the memory card 17. Alternatively, the video game program may be pre-stored in a non-volatile storage device inside the computer system. The information storage medium for storing the video game program is not limited to a non-volatile semiconductor memory, but may alternatively be a CD-ROM, a DVD or any other suitable type of an optical disk medium.

Figure 4:
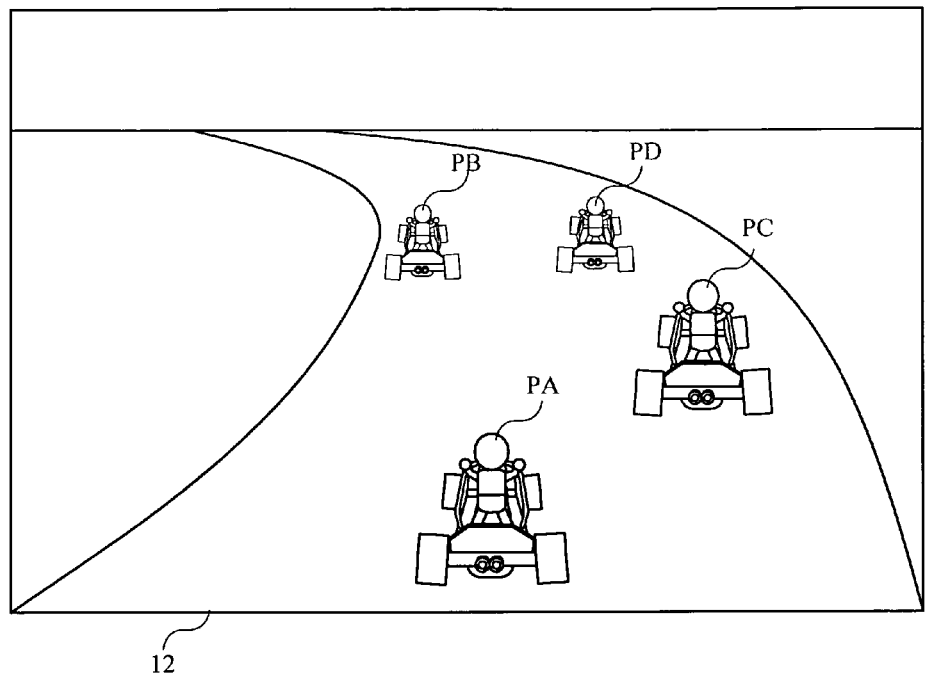
FIG. 4 shows an exemplary screen image of a racing game displayed on a second LCD 12 of a video game device 1A of FIG. 3.
Figure 5:
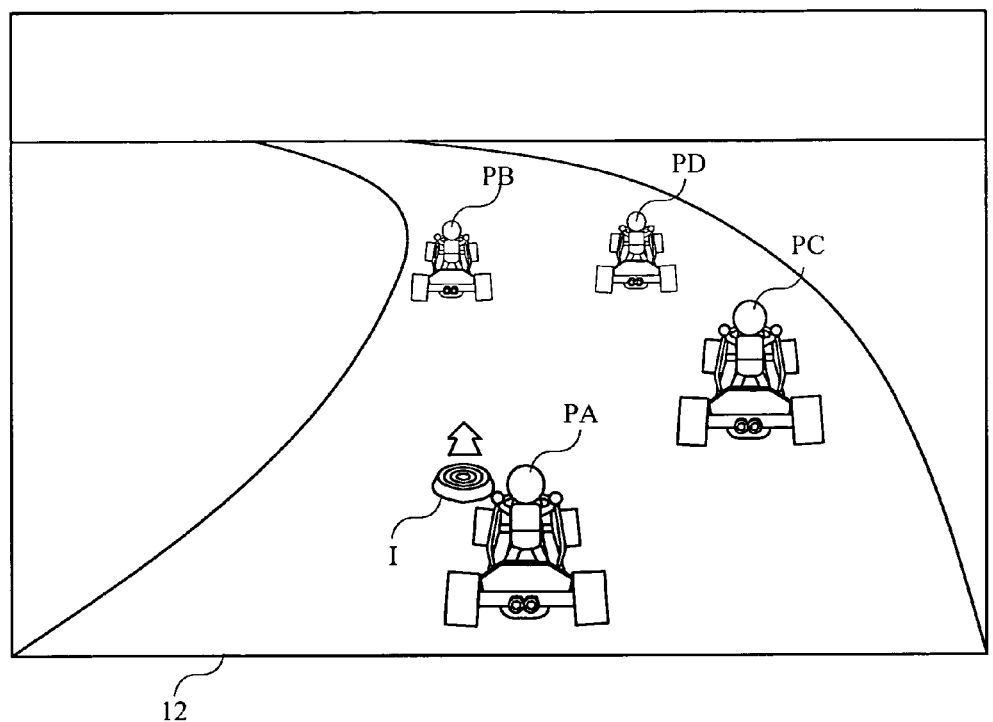
FIG. 5 shows an exemplary screen image where an item I is introduced into the racing game displayed on the second LCD 12 of FIG. 4.
Figure 6:
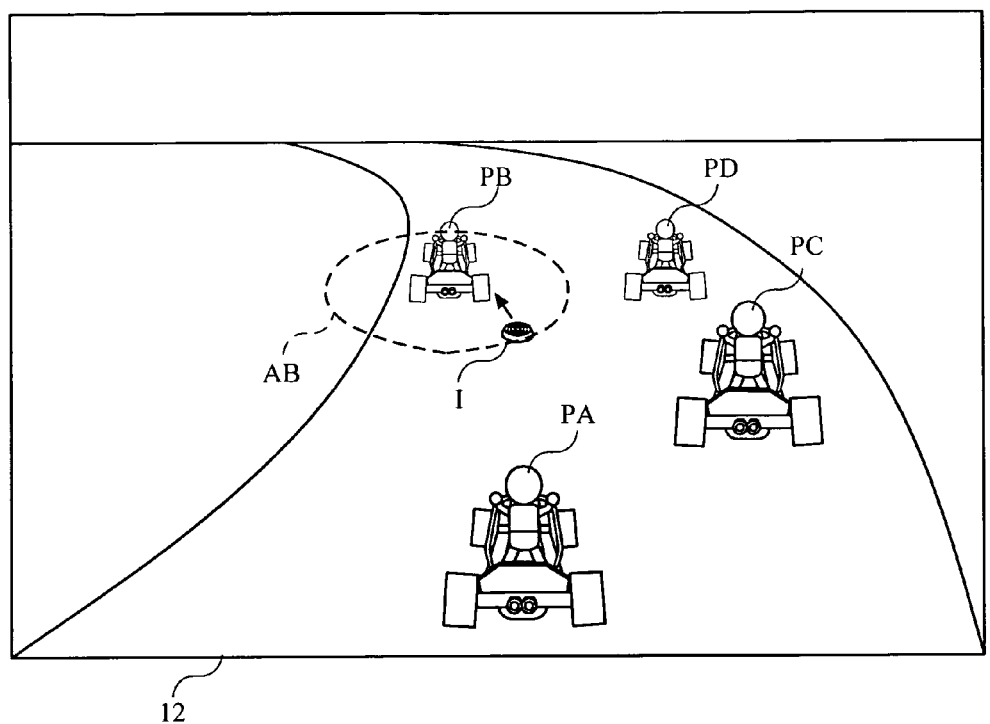
FIG. 6 shows an exemplary screen image of the racing game displayed on the second LCD 12 of FIG. 4, where the item I has entered a target area AB of a player character PB.
Figure 7:
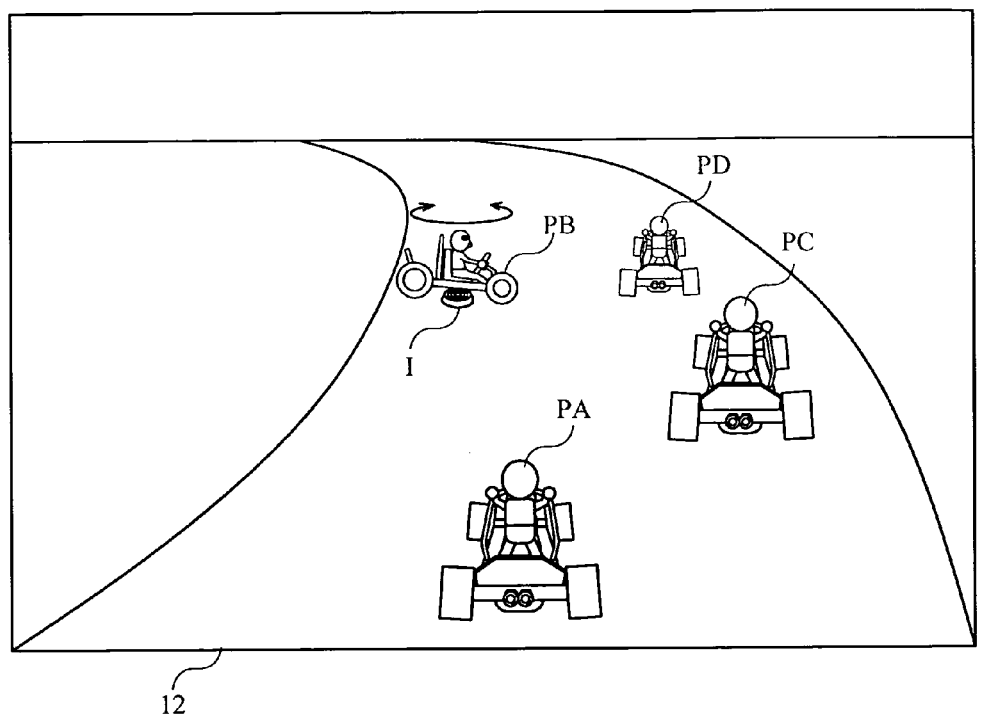
FIG. 7 shows an exemplary screen image of the racing game displayed on the second LCD 12, where the item I has collided with the player character PB.

Referring now to FIGS. 4 to 7, examples of how images are displayed on the second LCD 12 during the processing operation of the video game program executed by the video game device 1 will be described, before describing the processing operation in detail. For the purpose of illustration, the following description will be directed to a case where the video game devices 1A to 1D are each connected to a network such as the Internet via the wireless communications section 33 and exchange data with one another via the network so as to realize a racing game on the second LCD 12. FIG. 4 shows an exemplary screen image of a racing game displayed on the second LCD 12 of the video game device 1A. FIG. 5 shows an exemplary screen image where an item I is introduced into the racing game displayed on the second LCD 12. FIG. 6 shows an exemplary screen image of the racing game displayed on the second LCD 12, where the item I has entered a target area AB of a player character PB. FIG. 7 shows an exemplary screen image of the racing game displayed on the second LCD 12, where the item I has hit the player character PB.

Referring to FIG. 4, a racing game is being played between a plurality of video game devices 1A to 1D, as an example of a multi-player video game to be played in a common game space via a network. Specifically, the players of the video game devices 1A to 1D control player characters (carts) PA to PD, respectively. In this racing game, there is defined a racetrack in a game space common to all the video game devices 1A to 1D, and the players compete for fastest time of the player characters PA to PD running around the racetrack.

As the players operate the video game devices 1A to 1D, a synchronization control operation is performed so that the player characters PA to PD are simultaneously present along the racetrack. Game data necessary for the synchronization control operation are exchanged between the video game devices 1A to 1D via the network. Through these exchanges of data, a player can know how other player characters are running (e.g., the speed, the direction, etc.) as determined by the operations made by the other players, and how player characters are running is reflected on each of the video game devices 1A to 1D. On the second LCD 12 of each of the video game devices 1A to 1D, the game space is displayed while being centered about the player character controlled by the subject device (the term "subject device" is used herein to refer to one of the participating video game devices that is being the subject of discussion as distinguished from the other participating video game devices, and the term "subject player character" is used herein to refer to a player character that is controlled by the subject device as distinguished from the other player characters). FIGS. 4 to 7 show exemplary game images to be displayed on the second LCD 12 of the video game device 1A.

Referring to FIG. 5, the item I can be used in the racing game for obstructing the other player characters. The item I can be used by the player of any of the video game devices 1A to 1D by performing a predetermined operation input while a predetermined condition is being satisfied. In the illustrated example, in response to the predetermined operation input, the item I is introduced onto the racetrack near the position of the player character being controlled by the player who performed the predetermined operation input. The item I, which has been introduced onto the racetrack, moves along the racetrack with the speed and direction thereof being determined based on a predetermined rule. The driving of any of the player characters PA to PD that is hit by the item I is obstructed. FIG. 5 shows an example where the player of the video game device 1A uses the item I, wherein the item I appears on the screen near the player character PA. Then, the item I moves along the racetrack in the direction indicated by an open white arrow extending from near the player character PA.

Referring to FIG. 6, target areas AA to AD are defined each centered about the corresponding one of the player characters PA to PD. After the item I enters any of the target areas AA to AD, the item I is controlled so as to home in on the corresponding one of the player characters PA to PD. In the case of FIG. 6, the item I has entered the target area AB, whereby the player character PB is determined to be the target object on which the item I will be homing in. Then, the item I is controlled so as to chase the player character PB being the target object.

Referring to FIG. 7, when the item I hits any of the player characters PA to PD, the item I obstructs the driving of the player character along the racetrack. In the case of FIG. 7, the item I hits the player character PB and obstructs the driving of the player character PB along the racetrack. Specifically, the player character PB is caused to spin. After hitting, and obstructing the driving of, any of the player characters PA to PD, the item I is erased from the racetrack.

As described above, the item I is introduced into the game space from any of the player characters PA to PD. Then, after obstructing the driving of a player character that the item I hits, the item I is erased. Thus, the item I is an object that is not controlled by the players of the video game devices 1A to 1D but is moved across the game space according to a predetermined rule, from the introduction thereof into the game space until the erasure thereof from the game space. Where the movement of such an item I is represented in a racing game played in a common game space between a plurality of video game devices 1A to 1D via a network, time differences occurring when exchanging data between the video game devices 1A to 1D may result in different situations being represented on the video game devices 1A to 1D. For example, the item I may be shown to collide with, and obstruct the driving of, the player character PB on one video game device 1, while it is shown to collide with, and obstruct the driving of, a different player character (e.g., PD) on a different video game device 1. With such a discrepancy during the game play, the racing game in a common game space will fail. If one video game device 1 is selected as the reference device, with other video game devices all following the reference device, there may be abrupt changes in the game image displayed on the non-reference devices, which may leave the players with awkwardness. With the game process to be described hereinbelow, it is possible to realize a game image that causes no awkwardness to the players of the video game devices 1 while avoiding any discrepancies that may possibly occur from when the item I is introduced into the game space until the item I is erased from the game space.

Figure 8:
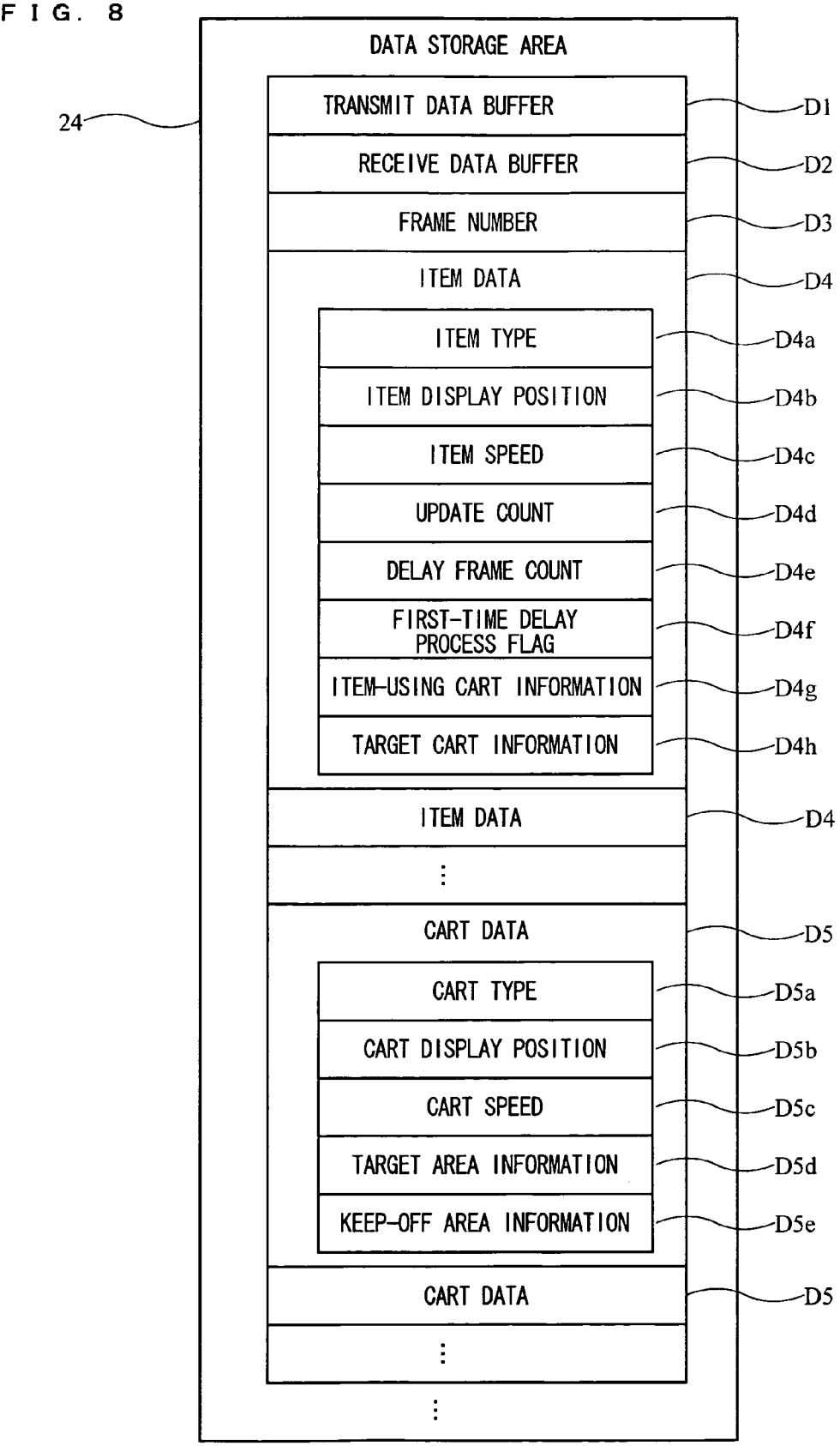
FIG. 8 shows different pieces of data that are stored in a RAM 24 during the processing operation of the video game program executed by the video game device 1 of FIG. 1.
Figure 9:
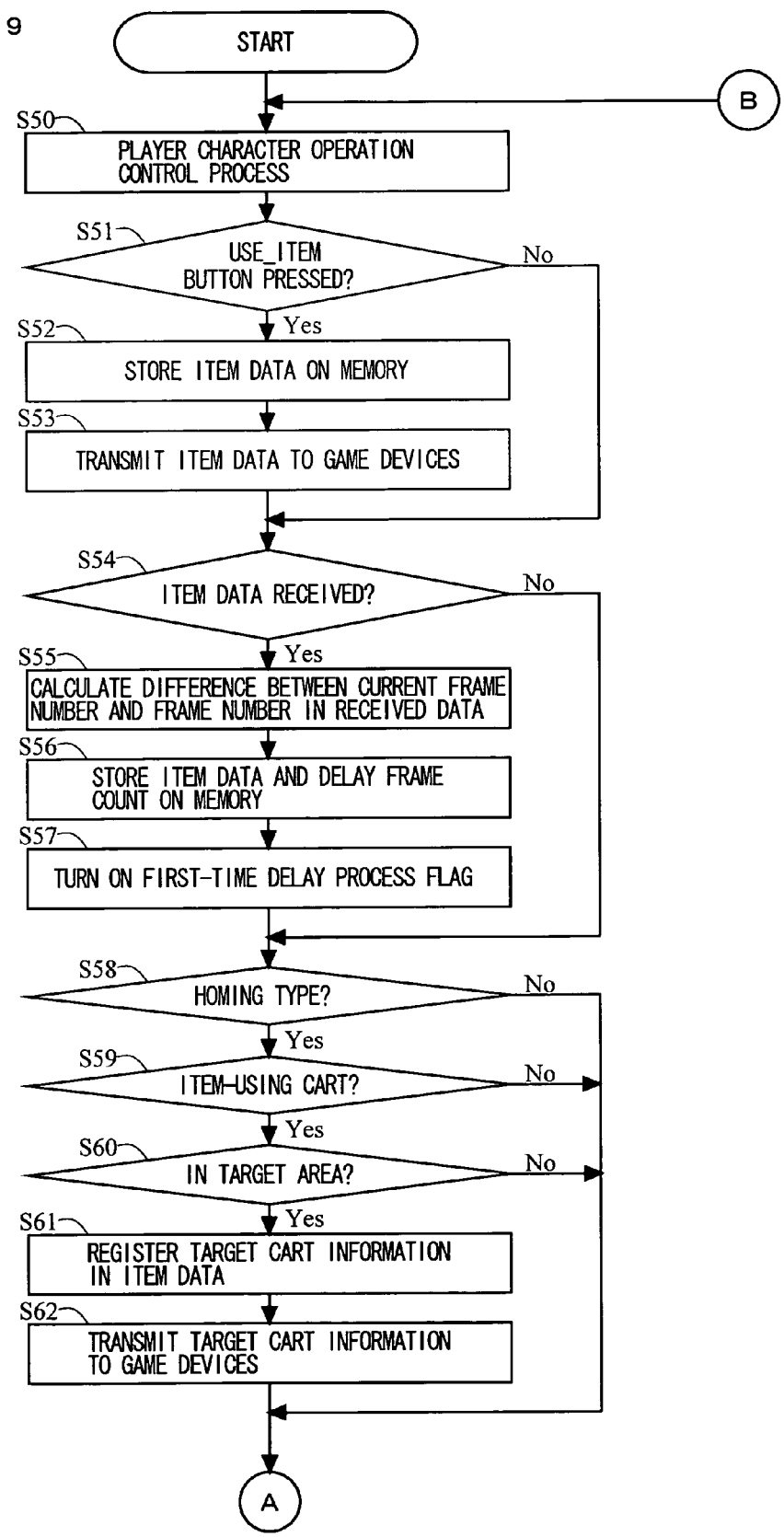
FIG. 9 is a flow chart showing the first half of the game process performed by the video game device 1 when the video game program is executed by the video game device 1 of FIG. 1.
Figure 10:
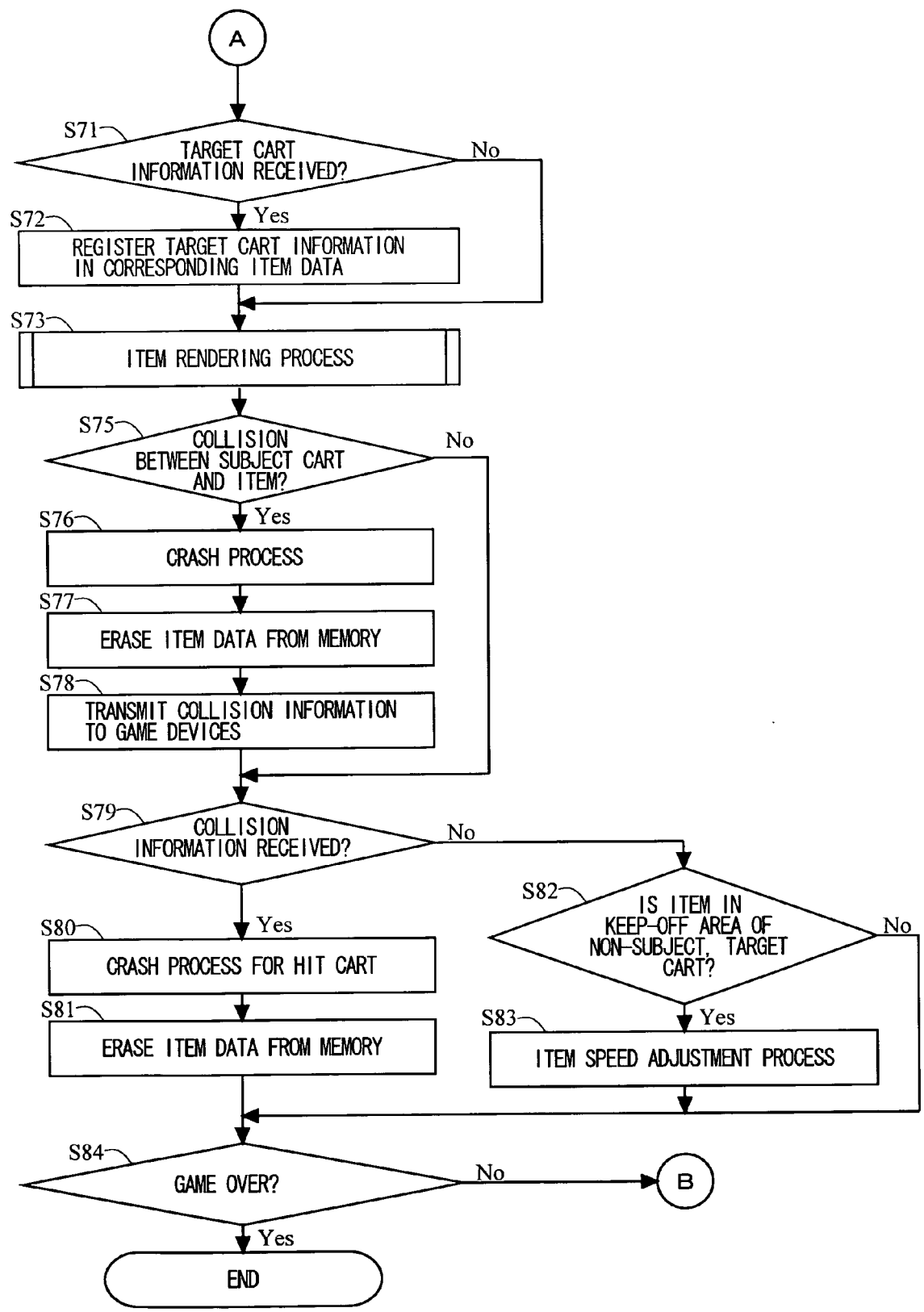
FIG. 10 is a flow chart showing the latter half of the game process performed by the video game device 1 when the video game program is executed by the video game device 1 of FIG. 1.
Figure 11:
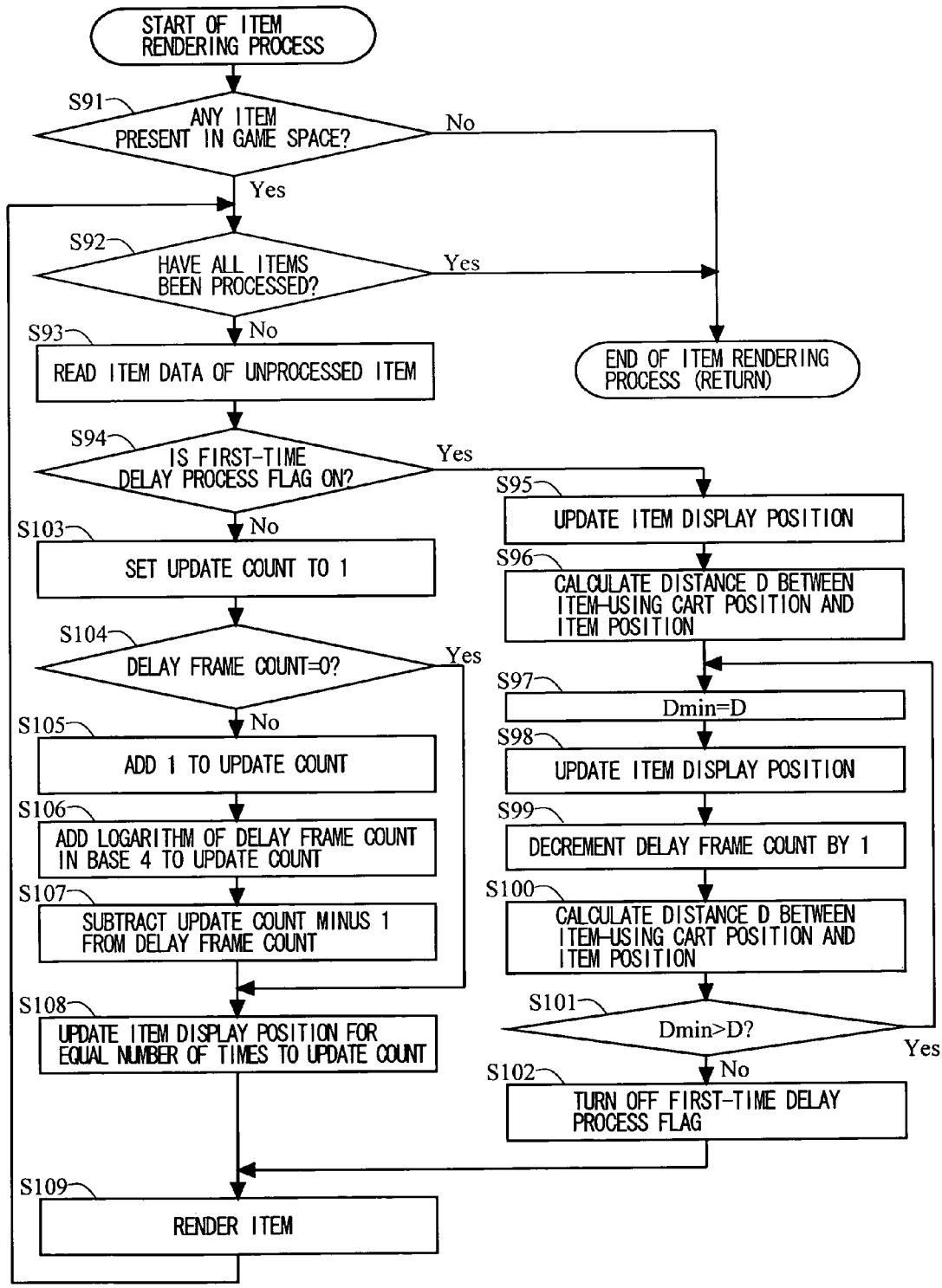
FIG. 11 shows an item rendering process subroutine in step 73 of FIG. 10.
Figure 12:
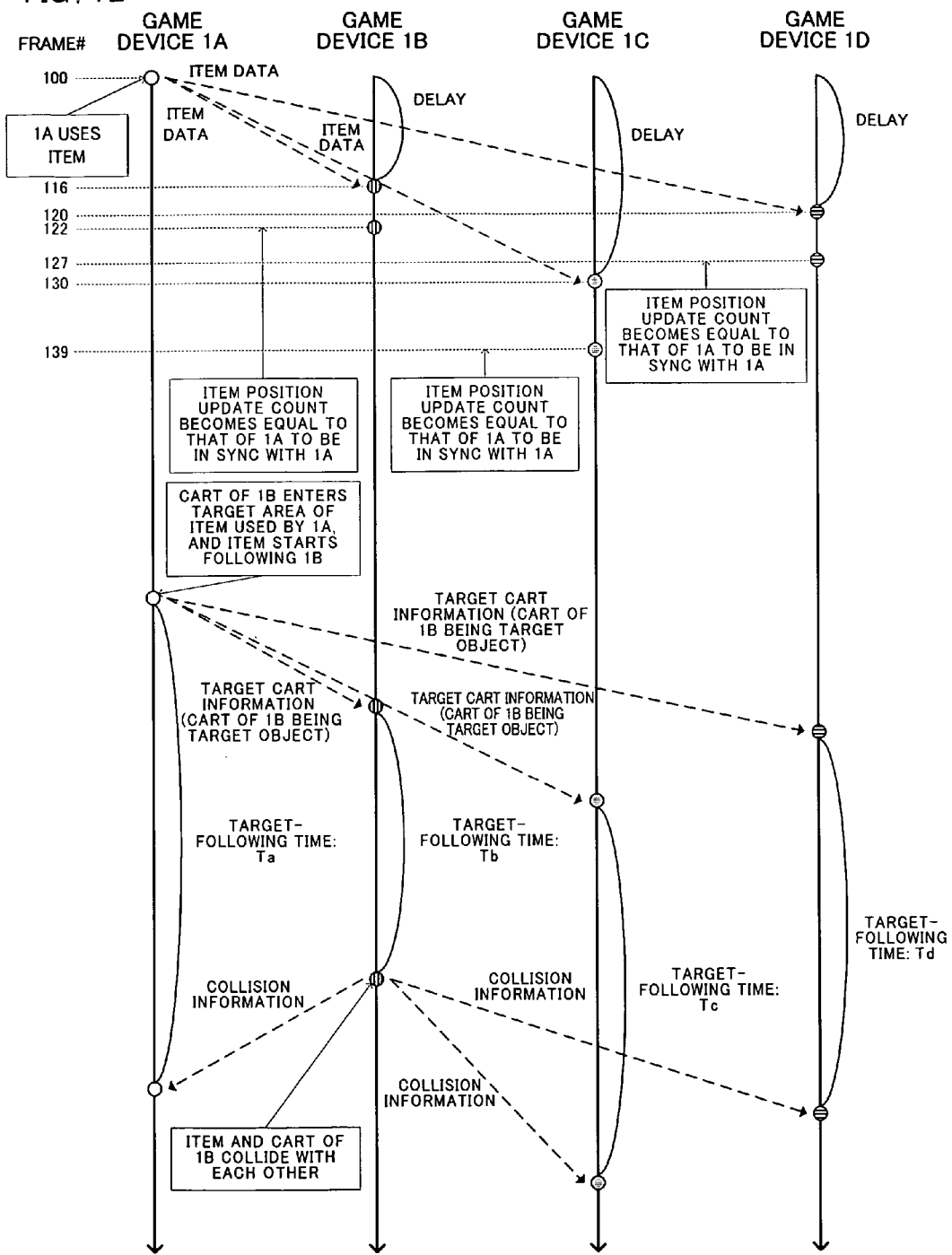
FIG. 12 shows how video game devices 1A to 1D are synchronized together by the process shown in FIGS. 9 to 11.

Referring now to FIGS. 8 to 13, specific processing operations of the video game program executed by the video game device 1 will be described. FIG. 8 shows different pieces of data that are stored in the RAM 24 during the processing operation of the video game program. FIG. 9 is a flow chart showing the first half of the game process performed by the video game device 1 when executing the video game program. FIG. 10 is a flow chart showing the latter half of the game process performed by the video game device 1 when executing the video game program. FIG. 11 shows an item rendering process subroutine in step 73 of FIG. 10. FIGS. 12 and 13 show how the video game devices 1A to 1D are synchronized together by the process shown in FIGS. 9 to 11. Programs for performing these operations are included in the video game program stored in the ROM 17a. When the power supply of the video game device 1 is turned ON, these programs are loaded from the ROM 17a to the RAM 24 and executed by the CPU core 21. For the purpose of illustration, the following description will be directed to a case where the video game devices 1A to 1D are connected to a network such as the Internet via the wireless communications section 33 for playing the racing game together via the network, wherein the item I is used during the game. When a racing game is played via the network, the video game devices 1A to 1D periodically transmit various game data to be received by the video game devices 1A to 1D. However, the following description will be directed primarily to data to be exchanged that are related to the item I.

Referring to FIG. 8, a data storage area in the RAM 24 of each video game device 1 stores data to be exchanged with other video game devices 1 and data for forming the game space. The data storage area of the video game device 1 stores a transmit data buffer D1, a receive data buffer D2, a frame number D3, an item data D4, a cart data D5, etc.

The transmit data buffer D1 temporarily stores a data frame containing data to be transmitted to other video game devices 1. At predetermined transmission timing, a transmit data frame prepared in the transmit data buffer D1 is transmitted to other video game devices 1 via the wireless communications section 33. The receive data buffer D2 is a buffer area for temporarily storing a data frame received from other video game devices 1. The frame number D3 is information representing the frame number of the game image being represented on the subject device.

The item data D4 is information regarding the item I (see FIGS. 5 to 7) being present in the game space. Where there are a plurality of items I in the game space, the item data D4 is stored for each of the items I. The item data D4 includes an item type D4a, an item display position D4b, an item speed D4c, an update count D4d, a delay frame count D4e, a first-time delay process flag D4f, an item-using cart information D4g, target cart information D4h, etc. The item type D4a is information representing the type of the item I for distinguishing different types of items, e.g., an item that homes in on a particular cart, an item that only moves in a straight path, etc. The item display position D4b is information representing the position in the game space at which the item I is displayed. The item speed D4c is information representing the speed and direction of the movement of the item I in the game space, and may be a vector in the game space, for example. The update count D4d, the delay frame count D4e and the first-time delay process flag D4f are information that are used when performing a synchronization control operation for the video game device 1 that has introduced the item I. The item-using cart information D4g is information representing the player character that is using the item I, and can identify the video game device 1 that has introduced the item I. The target cart information D4h is information representing the player character being the target object of the item I.

The cart data D5 is information regarding the player characters (carts) PA to PD (see FIGS. 4 to 7) being present in the game space. Where there are a plurality of player characters in the game space, the cart data D5 is stored for each of the player characters. The cart data D5 includes a cart type D5a, a cart display position D5b, a cart speed D5c, target area information D5d, keep-off area information D5e, etc. The cart type D5a is information representing the cart type of the player character. The cart display position D5b is information representing the position in the game space at which the player character is displayed. The cart speed D5c is information representing the speed and direction of the movement of the player character in the game space, and may be a vector in the game space, for example. The target area information D5d is information regarding the target areas AA to AD (see FIG. 6) defined for the player characters PA to PD, and represents the size, the shape, etc., of the target areas AA to AD. The keep-off area information D5e is information regarding the keep-off area defined for each of the player characters PA to PD, and represents the size, the shape, etc., of the keep-off area.

First, when the power supply (the power switch 14h) of the video game device 1 is turned ON, a boot program (not shown) is executed by the CPU core 21, whereby the video game program stored in the memory card 17 is loaded to the RAM 24. The loaded video game program is executed by the CPU core 21, thereby performing steps shown in FIG. 9 (an abbreviation "S" is used for "step" in FIGS. 9 to 11). Then, the video game devices 1 participating in the racing game realized by executing the video game program (specifically, the video game devices 1A to 1D shown in FIG. 3) are connected together via a network so that they can exchange data with one another. In the flow charts discussed below, it is assumed that each video game device 1 participating in the racing game periodically transmits, by means of its data communications function, the cart data D5 (see FIG. 8) of the player character controlled by the video game device 1 to other video game devices 1 and updates the RAM 24 of the subject device with the cart data D5 received from the other video game devices 1.

Referring to FIG. 9, the CPU core 21 controls the player characters PA to PD to update the cart data D5 of the player characters PA to PD stored in the RAM 24 of the subject device, and displays the player characters PA to PD on the second LCD 12 (step 50). Specifically, for a player character controlled by the subject device, the CPU core 21 of the video game device 1 controls the player character to update the cart data D5 in response to the player's operation on the touch panel 15 or the control switch section 14, and periodically transmits the updated cart data D5 to the other video game devices 1. For player characters controlled by the other video game devices 1, the CPU core 21 receives the cart data D5 periodically transmitted from the other video game devices 1 to update the cart data D5 stored in the RAM 24 of the subject device. Thus, the player characters PA to PD are controlled while ensuring the synchronization between the video game devices 1.

Then, the CPU core 21 determines whether or not the use_item button is pressed (step 51). If so, the process proceeds to step 52. If the use_item button is not pressed (including a case where the item-using condition is not satisfied), the process proceeds to step 54. For example, the use_item button is the control switch section 14 and is used for introducing the item I onto the racetrack. Any of the players of the video game devices 1A to 1D can use the item I by pressing the use_item button while a predetermined condition is being satisfied.

In step 52, in response to the use_item button being pressed, the CPU core 21 stores the item data D4 (see FIG. 8) regarding the item I to be introduced onto the racetrack in the RAM 24, and the process proceeds to the next step. The item type D4a and the item speed D4c of the item data D4 are set to their predetermined default values. The item display position D4b of the item data D4 is set to be a predetermined position with respect to the current position in the game space of the player character controlled by the video game device 1 (the cart display position D5b of the player character controlled by the subject device), e.g., near the current position of the player character. The item-using cart information D4g of the item data D4 is set to be the player character controlled by the video game device 1. As the item data D4 is stored in the RAM 24, the item I is displayed on the second LCD 12 of the video game device 1 at the item display position D4b in the game image at the current frame number D3, whereby the item I is introduced onto the racetrack near the position of the player character controlled by the player, who has pressed the use_item button (see FIG. 5). Then, the CPU core 21 stores the frame number D3 and the item data D4 in the transmit data buffer D1, and transmits the frame number D3 and the item data D4 to the other video game devices 1 via the wireless communications section 33 at transmission timing (step 53), and the process proceeds to step 54.

In step 54, the CPU core 21 determines whether or not the item data D4 has been received from another video game device 1 via the wireless communications section 33. If so, the process proceeds to step 55. Otherwise, the process proceeds to step 58.

In step 55, the CPU core 21 subtracts the frame number D3 of the other video game device 1 included in the received data from the frame number D3 of the subject device to obtain the difference as the delay frame count. Then, the CPU core 21 newly stores the received item data D4 in the RAM 24 (step 56). The delay frame count D4e of the item data D4 newly stored in the RAM 24 is the delay frame count as calculated in step 55. If another set of the item data D4 is already stored in the RAM 24, the CPU core 21 stores the received item data D4 in another data storage area. Then, the CPU core 21 turns ON the first-time delay process flag D4f of the item data D4 stored in the RAM 24 in step 56 (step 57), and the process proceeds to step 58.

In step 58, the CPU core 21 refers to the item type D4a to determine whether or not the item I, which has been introduced into the game space, is of a type that homes in on a player character (the "homing" type). If so, the process proceeds to step 59. Otherwise, the process proceeds to step 71 (FIG. 10).

In step 59, the CPU core 21 determines whether or not there is any item data D4 of which the item-using cart information D4g specifies the player character controlled by the subject device. If so (i.e., if the player character is an item-using cart), the process proceeds to step 60. Otherwise, the process proceeds to step 71 (FIG. 10).

In step 60, the CPU core 21 determines whether or not the item I of which the item-using cart information specifies the subject device has entered any of the target areas AA to AD of the player characters PA to PD (see FIG. 6). Specifically, the CPU core 21 refers to the item display position D4b of the item data D4, of which the item-using cart information D4g specifies the subject device, to determine whether or not the item display position D4b is within any of the areas represented by the cart display position D5b and the target area information D5c of the cart data D5. If it is determined that the item I has entered any of the target areas AA to AD, the process proceeds to step 61. Otherwise, the process proceeds to step 71 (FIG. 10).

In step 61, the CPU core 21 determines one of the player characters PA to PD associated with one of the target areas AA to AD that the item I has entered as being the target object, and registers the player character being the target object in the target cart information D4h included in the item data D4 regarding the item I. Then, the CPU core 21 stores the target cart information D4h registered in step 61 in the transmit data buffer D1, and transmits the target cart information D4h to the other video game devices 1 via the wireless communications section 33 at transmission timing (step 62), and the process proceeds to step 71 (FIG. 10).

In step 71 of FIG. 10, the CPU core 21 determines whether or not the target cart information D4h has been received from another video game device 1 via the wireless communications section 33. If so, the CPU core 21 registers the received target cart information D4h in the corresponding item data D4 (step 72), and the process proceeds to step 73. Otherwise, the process proceeds to step 73.

In step 73, the CPU core 21 performs the item rendering process. Referring now to FIG. 11, the item rendering process performed by the CPU core 21 will be described.

Referring to FIG. 11, the CPU core 21 determines whether or not any item I is present in the game space (i.e., whether or not any item data D4 is stored) (step 91). If so, the process proceeds to step 92. Otherwise, the process exits the subroutine.

In step 92, the CPU core 21 determines whether or not all the items I present in the game space have been processed. If there is any unprocessed item I, the process proceeds to step 93. If all the items I have been processed, the process exits the subroutine.

In step 93, the CPU core 21 selects one of the unprocessed items I, and reads the item data D4 of the selected item I. The process of steps 94 to 109 to be described below is performed on the item data D4 read in step 93. Then, the CPU core 21 determines whether or not the first-time delay process flag D4f of the item data D4 is ON (step 94). If so, the process proceeds to step 95. Otherwise, the process proceeds to step 103.

In step 95, the position at which the item I is displayed (the item display position D4b) is moved by a distance for a single cycle of the normal game process (for one frame) according to the speed of the item I (the item speed D4c) based on a predetermined rule, thus updating the item display position D4b. Then, the CPU core 21 refers to the item-using cart information D4g to calculate the distance D between the current position of the player character, which has introduced the item I (the cart display position D5b), and the position of the item I updated in step 95 (step 96). Then, the process proceeds to the next step.

Then, the CPU core 21 defines a minimum distance Dmin to be equal to the calculated distance D (step 97). Then, the CPU core 21 updates the item display position D4b by moving the position at which the item I is displayed (the item display position D4b) by a distance for a single cycle of the normal game process (for one frame) according to the speed of the item I based on a predetermined rule (step 98), and the CPU core 21 updates the delay frame count D4e by decrementing the delay frame count D4e by 1 (step 99). Then, the CPU core 21 calculates the distance D between the current player character position (the cart display position D5b)

referred to in step 96 and the position of the item I updated in step 98 (step 100), and determines whether or not the distance D is less than the minimum distance Dmin as defined in step 97 (step 101). If Dmin>D, the process returns to step 97 to repeat the process. If Dmin<D, the CPU core 21 turns OFF the first-time delay process flag D4*f* (step 102), and the process proceeds to step 109.

By repeating steps 97 to 101 as described above, the initial position of the item I is determined to be the position at which the distance between the item I and the item-using cart takes the minimum value. Thus, when an item I is introduced into the game space, the item I will appear near the item-using cart in a natural manner even on a video game device 1 that is controlling a non-item-using player character. Strictly speaking, however, after repeating the process of steps 97 to 101, the updated position will be a position past the minimum, i.e., the position will be overly updated by the distance corresponding to one iteration of the process. The item rendering process in step 109 may be performed with such an excessive update count. Alternatively, the item rendering process may be performed using the value of the item display position D4*b* before the last iteration of the update process only when the process passes through the process of steps 97 to 101 (the first-time delay process).

If it is determined in step 94 that the first-time delay process flag D4*f* is OFF, the CPU core 21 sets the update count D4*d* to 1, and registers the update count D4*d* in the item data D4 in step 103. Then, the CPU core 21 determines whether or not the delay frame count D4*e* is 0 (step 104). If not, the process proceeds to step 105. If the delay frame count D4*e* is 0, the process proceeds to step 108.

In step 105, the CPU core 21 updates the update count D4*d* by adding +1 to the update count D4*d*. Then, the CPU core 21 updates the update count D4*d* by further adding the logarithm of the delay frame count D4*e* in base 4, i.e., $\text{Log}_4$ (delay frame count), to the update count D4*d* (rounded down to the nearest whole number) (step 106). Then, the CPU core 21 updates the delay frame count D4*e* by subtracting the current value of the update count D4*d* minus 1 from the delay frame count D4*e* (step 107). Then, the process proceeds to step 108.

In step 108, the CPU core 21 refers to the value (count) of the update count D4*d*, and updates the item display position D4*b* by moving the position at which the item I is displayed (the item display position D4*b*) by a distance for a single cycle of the normal game process times the update count (i.e., a distance for an equal number of frames to the update count D4*d*) according to the speed of the item I (the item speed D4*c*) based on a predetermined rule. Then, the process proceeds to step 109.

The speed of the item I used in step 108 when the item I is homing in on a player character will now be described. As described above, once the target cart is determined, the item I moves along the racetrack following the movement of the target cart. Thus, after the target object is determined, the speed of the item I is influenced by the movement of the target object. For example, the CPU core 21 calculates the new speed of the item I based on a predetermined function, by using the current speed of the item I (the item speed D4*c*), the current position thereof (the item display position D4*b*), the speed of the target cart (the cart speed D5*c*), and the position thereof (the cart display position D5*b*). Specifically, the new speed Vin of the item I is calculated as follows:

$$Vin = Vi + Kp(P-Pi) + Kd(V-Vi) \qquad \text{Exp. 1}$$

where P is the position of the target cart, V is the speed of the target cart, Pi is the position of the item I, and Vi is the speed of the item I. Kp is the spring coefficient and Kd a damper coefficient. Thus, Expression 1 above is a function representing a control system having a spring and a damper. Within the area where no vibration occurs in Expression 1 above, increasing/decreasing the spring coefficient Kp shortens/elongates the amount of time over which the item I follows the target object. As will be apparent later, the "target-following time", i.e., the amount of time from when the target cart of the item I is determined until the item I hits the target cart, varies depending on the transmission/reception time between the video game devices 1. Under such a communications environment, it is possible to adjust the item's capability ("target-following capability") of following the target object by adjusting the spring coefficient Kp according to the expected target-following time.

In step 109, the CPU core 21 renders the item I at a position according to the item display position D4*b*, and displays the game image on the second LCD 12. Then, the CPU core 21 marks the item data D4 as "processed", and the process proceeds to step 92 to repeat the process.

Referring back to FIG. 10, after the item rendering process in step 73, the CPU core 21 determines whether or not the player character controlled by the subject device has collided with the item I. Specifically, the CPU core 21 makes the determination based on the cart display position D5*b* of the player character controlled by the subject device and the item display position D4*b*. If the CPU core 21 determines that the player character has collided with the item I, the process proceeds to step 76. Otherwise, the process proceeds to step 79.

In step 76, the CPU core 21 performs a crash process for showing a crash between the item I and the player character (that is controlled by the subject device and hit by the item I) on the racetrack. In the crash process, a game image is presented, showing the player character spinning or rolling over on the racetrack. Then, the CPU core 21 erases the item data D4 of the item I from the RAM 24 (step 77). Then, the CPU core 21 stores, in the transmit data buffer D1, collision information that indicates that the item I and the player character controlled by the subject device have collided with each other, and transmits the collision information to the other video game devices 1 via the wireless communications section 33 at transmission timing (step 78), and the process proceeds to step 79.

In step 79, the CPU core 21 determines whether or not collision information has been received from any other video game device 1 via the wireless communications section 33. If so, the CPU core 21 performs a crash process for showing a crash between the item I and the player character controlled by the other video game device 1 (step 80) and erases the item data D4 of the item I from the RAM 24 (step 81), and the process proceeds to step 84. If collision information has not been received from any other video game device 1, the process proceeds to step 82.

In step 82, in a case where the item I is a homing type item, the CPU core 21 determines whether or not the item I has entered a keep-off area defined for the player character being the target object and controlled by the other video game device 1. Then, if the item I has entered the keep-off area of the non-subject, target cart, the CPU core 21 performs a speed adjustment process for the item I (step 83), and the process proceeds to step 84. If the item I is not a homing type item or if the item I has not entered the keep-off area of the non-subject, target cart, the process proceeds to step 84. Keep-off areas are defined each centered about the corresponding one of the player characters PA to PD. When an item I on the racetrack enters the keep-off area defined for one of the player characters PA to PD being the target object and controlled by one of the other video game devices 1, the speed of the item I (the item speed D4c) is adjusted so as not to collide with that player character.

In step 84, the CPU core 21 determines whether or not to end the racing game. For example, the racing game is ended when a game-over condition is met (e.g., when all the player characters have crossed the finish line, or when the controlled player character retires from the race) or when the player manually ends the game. If the game is not to be ended, the CPU core 21 returns to step 50 (FIG. 9) to repeat the process. If the game is to be ended, the CPU core 21 exits the process shown in the flow chart.

Referring now to FIGS. 12 and 13, an example of how the video game devices 1A to 1D are synchronized together by the process shown in FIGS. 9 to 11 will be described.

As shown in FIGS. 12 and 13, the player of the video game device 1A presses the use_item button (Yes in S51) at frame #100 (i.e., a frame that is assigned a frame number "100") to transmit the item data D4 to the other video game devices 1B to 1D (S53). After transmitting the item data D4 (i.e., at and after frame #101), the video game device 1A updates, for each frame, the item display position D4b by moving the display position of the item I by a distance for a single cycle of the normal game process (for one frame) according to the speed of the item I (repeating S108 with the update count being 1).

The other video game devices 1B to 1D receive the item data D4 (Yes in S54) from the video game device 1A via the network, thereby causing a time delay between the transmission and the reception. For example, the video game device 1B receives the item data D4 from the video game device 1A at frame #116. Then, the video game device 1B obtains the delay frame count "16" by subtracting the frame number "100" specified in the received data from the frame number "116" of the frame at which the data is received (S55). The video game device 1C receives the item data D4 from the video game device 1A at frame #130. Then, the video game device 1C obtains the delay frame count "30" by subtracting the frame number "100" specified in the received data from the frame number "130" of the frame at which the data is received (S55). The video game device 1D receives the item data D4 from the video game device 1A at frame #120. Then, the video game device 1D obtains the delay frame count "20" by subtracting the frame number "100" specified in the received data from the frame number "120" of the frame at which the data is received (S55).

After receiving the item data D4 at frame #116, the video game device 1B performs the first-time delay process (S95 to S102) at frame #117. The process of repeating steps 97 to 101 calculates the position at which the item I appears near the player character PA (i.e., the item-using cart) displayed on the second LCD 12 of the video game device 1B, and the item display position D4b is updated by an amount for the number of cycles (e.g., 10 cycles) needed for the calculation, whereby the delay frame count is 16−9=7. Then, the video game device 1B performs the process of steps 103 to 108 at frame #118. Then, the update count is 3 (1+1+Log$_4$7=3.40). Therefore, for the video game device 1B, the item display position D4b is updated three times at frame #118, whereby the delay frame count is 7−(3−1)=5. The video game device 1B repeats a process as described above for each frame until the delay frame count is 0 (e.g., at frame #122), and updates the item display position D4b by moving the item I with an update count larger than that for a single cycle of the normal game process (for one frame). When the process of steps 103 to 108 at frame #122 is completed, the update count will be the same between the video game device 1A and the video game device 1B, thereby realizing a synchronization therebetween for the movement of the item I.

The video game devices 1C and 1D also update the item display position D4b in a similar manner to that of the video game device 1B. Thus, when the process of steps 103 to 108 at frame #139 is completed, the update count will be the same between the video game device 1A and the video game device 1C, thereby realizing a synchronization therebetween for the movement of the item I. When the process of steps 103 to 108 at frame #127 is completed, the update count will be the same between the video game device 1A and the video game device 1D, thereby realizing a synchronization therebetween for the movement of the item I. Thus, when the item I is introduced into the game space, a video game device 1 that has instructed the introduction transmits information indicating the item introduction to the other video game devices 1. Thereafter, each of the video game devices 1 updates the position of the item I independently of one another so as to absorb the difference in the transmission/reception delay time, thereby synchronizing the whole video game system.

Next, assume that the item I enters the target area AB of the player character PB, as shown in FIG. 12. As is apparent from the process of steps 59 to 62, the determination of whether or not an item has entered a target area is performed only by the video game device (the video game device 1A) controlling the item-using cart (the player character PA). By limiting the video game device that determines the target object of the item I to a single video game device, it is possible to avoid possible discrepancies in the game play.

The video game device 1A transmits target cart information, indicating that the item I has entered the target area AB of the player character PB, to the other video game devices 1B to 1D (S62), and the other video game devices 1B to 1D will receive the target cart information (Yes in step 71). Then, the item I hits the target cart (the player character PB) (Yes in S75). As is apparent from the process of steps 74 to 78, the determination of whether or not the item has hit the target cart is performed only by the video game device (the video game device 1B) controlling the target cart (the player character PB). The determination of whether or not the item has hit a particular non-target cart is performed by the video game device (the video game device 1A, 1C or 1D) controlling the particular non-target cart (the player character PA, PC or PD). In other words, the collision detection between an item and a particular player character is performed only by a video game device 1 controlling the particular player character. By limiting the player characters for which the item collision detection is performed by each video game device 1 to a single player character (the subject cart) that is controlled by the particular video game device 1, it is possible to avoid possible discrepancies in the game play.

The video game device 1B transmits collision information, indicating that the player character PB and the item I have collided with each other, to the other video game devices 1A, 1C and 1D (S78), and the other video game devices 1A, 1C and 1D will receive the collision information (Yes in step 79). As shown in FIG. 12, the target-following time, i.e., the amount of time from when the target cart of the item I is determined until the item I hits the target cart, varies depending on the transmission/reception time between the video game devices 1. Specifically, the target-following times Ta to Td of the video game devices 1A to 1D, respectively, are in the following relationship: Tb<Tc<Ta and Tb<Td<Ta This is a phenomenon occurring because the video game device that determines the target object is different from the video game device that controls the target object, in a video game system where an amount of time is required for transmitting/receiving data between video game devices. Typically, the target-following time is longer for the video game device that determines the target object and shorter for the video game device that controls the target object. Therefore, while the item I is following the target object, if the video game devices 1 all move the item I at an equal speed, the item I may possibly hit the target object on a video game device 1 that is not performing the collision detection. Embodiments of the game systems disclosed herein may avoid such possible discrepancies through the adjustment (S108) of the target-following capability of the item I and the adjustment (S83) of the speed of the item I immediately before the collision.

It is possible to adjust the target-following time, i.e., the amount of time from when the target cart is determined until the item I hits the target cart, by adjusting the target-following capability (the spring coefficient Kp) of the item I by using Expression 1, as described above with respect to step 108. Specifically, for the video game device 1A determining the target object, whose target-following time Ta is longer than the target-following times of others, the spring coefficient Kp in Expression 1 is set to a relatively small value so as to decrease the speed at which the item I follows the target object. For the video game device 1B controlling the target object, whose target-following time Tb is shorter than the target-following times of others, the spring coefficient Kp in Expression 1 is set to a relatively large value so as to increase the speed at which the item I follows the target object. For the other video game devices 1C and 1D, whose target-following times Tc and Td are shorter than the target-following time Tb and longer than the target-following time Ta, the spring coefficient Kp in Expression 1 is set to an intermediate value (i.e., a value larger than Kp for the video game device 1A and smaller than Kp for the video game device 1B) so as to appropriately adjust the speed at which the item I follows the target object.

While the adjustment of the target-following capability of the item I as described above can, to some extent, eliminate possible discrepancies regarding the collision between the item I and the target object, the speed of the item I is also adjusted, when the item I comes close to hitting a player character on a video game device 1 that is not performing the collision detection, so as to avoid such a collision. Specifically, when the item I comes close to hitting a cart (non-subject cart) that is not controlled by the subject device, the speed of the item I is adjusted so as to avoid such a collision.

Thus, the present embodiment is directed to a video game system for realizing a video game played via a communications network by using information (the introduction time represented by the frame number D3 or the item data D4, the position, the speed, etc.) regarding an object (item) that the player can control only when introducing the object into the game space (i.e., after being introduced, the object is controlled based on a predetermined rule), wherein the information of the object introduced by the player of a video game device 1 is transmitted to other video game devices 1 only when the object is introduced into the game space and when the status thereof is changed (when the target object is determined, when the object is erased, etc.), based on which each video game device performs a calculation operation and a display control operation. Therefore, it is possible to reduce the amount of data to be transmitted, as compared with a case where such object information is frequently transmitted to the other video game devices 1 even after the object is introduced into the game space. As the average amount of data per one data transmission is decreased, it is possible to shorten the data transmission time for the same communications environment. In other words, under inferior communications environments, it is possible to prevent the data transmission time from becoming long. With the limitation on the video game device 1 that introduces an item into the game space and changes the status of the item, it is possible to avoid discrepancies in the game play, which may occur with respect to those changes. The synchronization between the video game devices 1 after the introduction of the object into the game space or the change of the status thereof is realized by adjusting the update count in the game process or the speed of the item I, whereby it is possible to display a game image on each video game device 1 that does not give awkwardness to the player.

In the game process described above, information regarding the item I is transmitted to other video game devices 1 when the item I is introduced into the game space, when the target object of the item I is determined, and when the item I is erased from the game space after hitting the subject cart. However, the information of the item I may be transmitted at other status changing events according to the game rule. For example, in a case where an item I introduced into the game space is an object that can be caught by a player character, information indicating the catch of the item I may be transmitted to other video game devices 1 when the item I is caught by any of the player characters.

Figure 14:
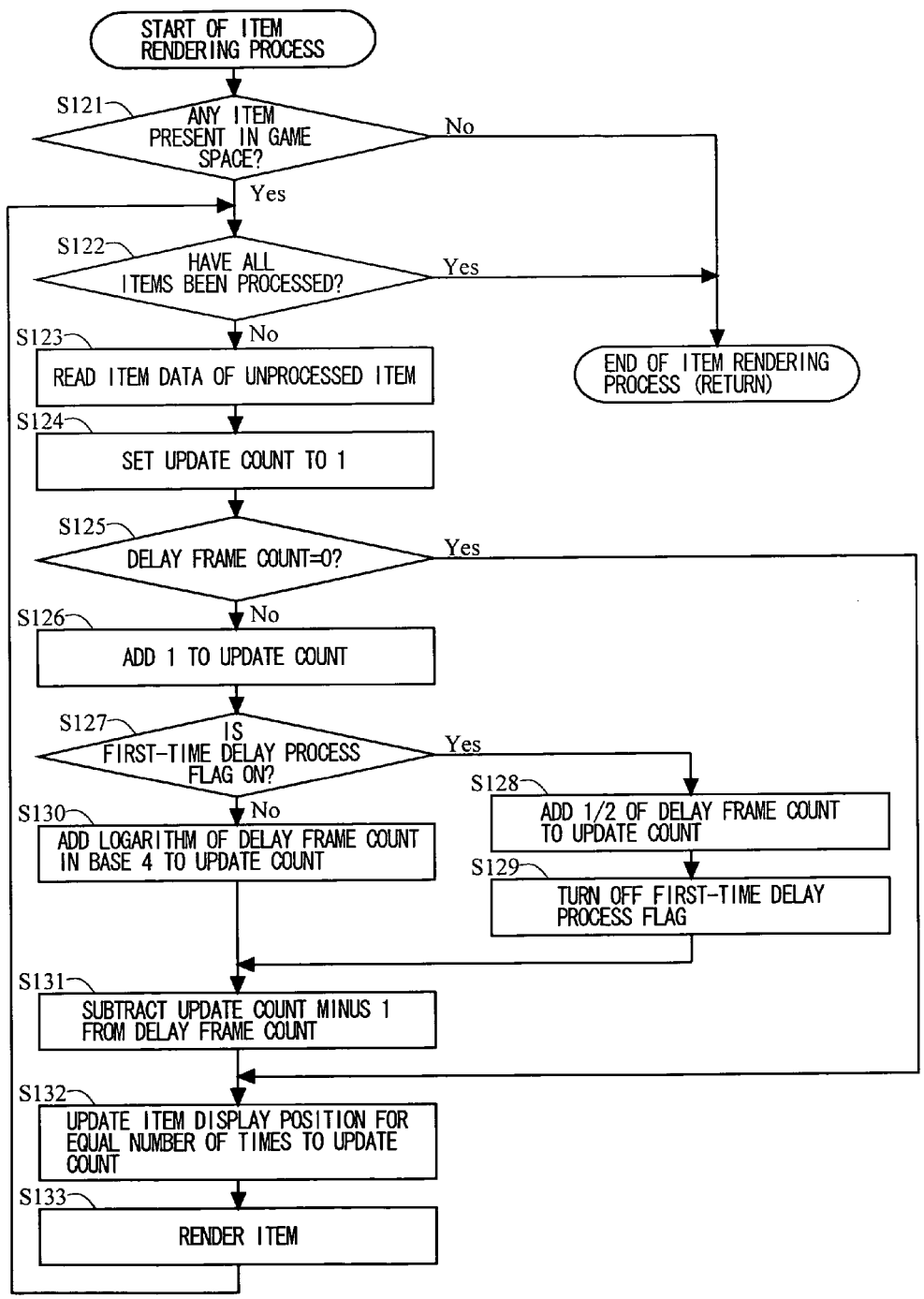
FIG. 14 shows an item rendering process subroutine in step 73 of FIG. 10.

When the item I is introduced into the game space through the process of steps 95 to 101 shown in FIG. 11, the item I will appear near the item-using cart in a natural manner even on a video game device 1 that is controlling a non-item-using player character. In a case where such an effect is not expected, the first-time delay process may be performed in any other suitable manner. An alternative example of the first-time delay process will now be described with reference to FIG. 14. FIG. 14 shows an item rendering process subroutine in step 73 of FIG. 10.

In FIG. 14, the process of steps 121 to 123 is similar to the process of steps 91 to 93 of FIG. 11, and will not be further described below.

In step 124, the CPU core 21 sets the update count D4d to 1 and registers the item data D4. Then, the CPU core 21 determines whether or not the delay frame count D4e is 0 (step 125). If not, the process proceeds to step 126. If the delay frame count D4e is 0, the process proceeds to step 132.

In step 126, the CPU core 21 updates the update count D4d by adding +1 to the update count D4d. Then, the CPU core 21 determines whether or not the first-time delay process flag D4f of the item data D4 read in step 123 is ON (step 127). If so, the process proceeds to step 128. Otherwise, the process proceeds to step 130.

Steps 128 and 129 correspond to the first-time delay process in the alternative example of the item rendering process. In step 128, the CPU core 21 updates the update count D4d by adding ½ of the delay frame count D4e to the update count D4d. Then, the CPU core 21 turns OFF the first-time delay process flag D4f (step 129), and the process proceeds to step 131.

In step 131, the CPU core 21 updates the delay frame count D4e by subtracting the current value of the update count D4d minus 1 from the delay frame count D4e. Then, the process proceeds to step 132.

In step 132, the CPU core 21 refers to the value (count) of the update count D4d, and updates the item display position D4b by moving the position at which the item I is displayed (the item display position D4b) by a distance for a single cycle of the normal game process times the update count (i.e., a distance for an equal number of frames to the update count D4d) according to the speed of the item I (the item speed D4c). The item display position D4b is updated while the target-following capability is adjusted, which process is similar to step 108 described above and will not be further described below. Then, the CPU core 21 renders the item I at the current item display position D4b (step 133), and displays the game image on the second LCD 12. Then, the CPU core 21 marks the item data D4 as "processed", and the process proceeds to step 122 to repeat the process.

Note that a racing game has been described above with specific processes for the purpose of illustration, it is understood that the present invention is not limited to those specific processes or to the racing game.

While a video game device 1 is connected to a network via a wireless connection in the description above, the video game device 1 may exchange data with other video game devices 1 via any other suitable means. For example, the video game device 1 and the network may be connected via a wired connection to exchange data with other video game devices 1. At least some of the plurality of video game devices 1 may exchange data directly with each other via a wireless or wired connection, without a network therebetween.

As an example of a dual-screen liquid crystal display section, the embodiment described above employs the first LCD 11 and the second LCD 12, which are physically separate from each other and are arranged one above the other (a horizontally-split dual-screen). Alternatively, other display screen arrangements may be employed. For example, the first LCD 11 and the second LCD 12 may be provided on the primary surface of the lower housing 13b in a left-right arrangement. Alternatively, a vertically-oriented LCD having a horizontal width equal to that of the second LCD 12 and a vertical length twice that of the second LCD 12 (i.e., a physically single LCD having a dual-screen display size) may be provided on the primary surface of the lower housing 13b, and the first and second display images may be displayed in the upper and lower neighboring display areas of the LCD. Alternatively, a horizontally-oriented LCD having a vertical width equal to that of the second LCD 12 and a horizontal length twice that of the second LCD 12 may be provided on the primary surface of the lower housing 13b, and the first and second display images may be displayed in the left and right neighboring display areas of the LCD. Thus, the first and second display images may be displayed on a physically single screen divided into two display areas. In a case where a physically single display screen is divided into two display areas in which the first and second display images are displayed, the touch panel 15 may be provided so as to cover the entire display screen.

While the touch panel 15 is provided integrally with the video game device 1 in the embodiment described above, it is understood that the present invention can be carried out even if a video game device and a touch panel are separately provided from each other. Moreover, the touch panel 15 may alternatively be provided on the upper surface of the first LCD 11. The control operation may be done only with the control switch section 14, without providing the touch panel 15. While two display sections (the first LCD 11 and the second LCD 12) are provided in the embodiment described above, only one display section may be provided in other embodiments. Specifically, the second LCD 12 as a single display section may be provided with the touch panel 15, without providing the first LCD 11. Alternatively, the touch panel 15 may be provided on the upper surface of the first LCD 11, without providing the second LCD 12.

While the embodiment described above uses portable video game devices 1, the present invention may use other types of information processing devices such as common personal computers or home-console video game devices, which are capable of exchanging data with other devices.

The video game system and the storage medium storing a video game program of the present invention can be applied to a multi-player video game, or the like, that is played between a plurality of video game devices via a communications network, wherein it is necessary in the game play that the video game devices are synchronized together.

While the invention has been described in detail, the foregoing description is in all aspects illustrative and not restrictive. It is understood that numerous other modifications and variations can be devised without departing from the scope of the invention.

What is claimed is:

1. A video game system, comprising a plurality of video game devices connected together so that the video game devices can communicate with one another, wherein the video game devices display the same virtual game world while being synchronized together, the virtual game world including therein player characters each controlled by one of the video game devices;
   a first video game device being one of the plurality of video game devices includes:
      a communications which exchanges data with other of the video game devices;
      a processor executing a first program stored in the first video game device, the first program causing the processor to perform:
         an object initial information production step to generate object initial information used for introducing an object, different from a first player character, into the virtual game world and control the object in the virtual game world, in response to a predetermined input operation by the player;
         an object operation controlling step to control the object according to a predetermined rule after introducing the object into the virtual game world based on the object initial information; and
         an object information transmitting step to transmit the object initial information to other video game devices via the communications device; and
   a second video game device being another one of the plurality of video game devices different from the first video game device includes:
      a communications device exchanging data with other of the video game devices;
   a processor executing a second program stored in the second video game device, the second program causing the processor to perform:
      an object information receiving step to receive the object initial information from the first video game device via the communications device; and
      an object operation controlling step to control the object according to a predetermined rule executed by the second video game device after the first video game device introduces the object into the virtual game world, wherein the object is represented and initially positioned in the virtual game world by the second video game device based on the object initial information, wherein the predetermined rule at least determines the movement of the object based on an initial object position included in the object initial information by the first video game device.

2. The video game system of claim 1, wherein:
   in the object initial information production step performed by the first video game device the object initial information includes introduction time information indicating a time at which the object is introduced into the virtual game world; and in the object operation controlling step of the second video game device includes calculating a delay time of the virtual game world represented by the second video game device with respect to the virtual game world represented by the first video game device based on the introduction time information included in the object initial information, and determines a position at which the object is to be introduced into, and controlled in, the virtual game world represented by the second video game device according to the delay time.

3. The video game system of claim 2, wherein when new object initial information is obtained, the object operation controlling step of the second video game device introduces the object based on a position of the first player character controlled by the first player character synchronization step in the virtual game world represented by the second video game device.

4. The video game system of claim 3, wherein:
the object initial information production step produces the object initial information so as to further include position information representing a position at which the object is introduced into the virtual game world; and
the object operation controlling step performed by the second video game device repeats updating the position of the object using the object initial information so as to introduce the object at a position closest to the first player character controlled in the first player character synchronization step.

5. The video game system of claim 3, wherein:
the object initial information production step performed by the first video game device produces the object initial information so as to further include position information representing a position at which the object is introduced into the virtual game world; and
the object operation controlling step performed by the second video game device calculates a travel time required for moving the object from a position in the virtual game world represented by the position information included in the object initial information to the position at which the object is introduced, and updates the delay time by subtracting the travel time from the delay time.

6. The video game system of claim 1, wherein:
the second program causes the processor in the second video game device to further perform:
a second player character operation controlling step to control a second player character in the virtual game world represented by the second video game device in response to a player's input operation; and
a second player character information transmitting step to transmit second player character information regarding an operation of the second player character to the other video game devices via the communications device at regular intervals;
the first program causes the processor in the first video game device to further perform:
a second player character information receiving step to receive the second player character information from the second video game device via the communications device; and
a second player character synchronization step to control the second player character in the virtual game world represented by the first video game device based on the second player character information;

when a distance between the second player character controlled by the second player character synchronization step and the object in the virtual game world becomes within a predetermined range,
the object operation controlling step of the first video game device determines the second player character to be a target object of the object, and controls the object so as to follow the second player character;
in the object information transmitting step target information is transmitted indicating the target object of the object to other video game devices via the communications device;
the object information receiving step of the second video game device receives the target information from the first video game device via the communications device; and
the object operation controlling step of the second video game device controls the object so as to follow the second player character controlled by the second player character operation controlling step in the virtual game world based on the target information.

7. The video game system of claim 6, wherein:
in the object operation controlling step of the second video game device, the object is controlled so as to follow the second player character at a first speed; and
the object operation controlling step of the first video game device controls the object so as to follow the second player character at a second speed lower than the first speed.

8. The video game system of claim 1, wherein:
the second program stored in the second video game device further causes the processor to perform:
a second player character operation controlling step to control a second player character in the virtual game world represented by the second video game device in response to a player's input operation;
a second player character information transmitting step to transmit second player character information regarding an operation of the second player character to the other video game devices via the communications device at regular intervals;
a collision detection step to detect, only for the second player character, a collision with the object in the virtual game world represented by the second video game device; and
a collision information transmitting step to transmit collision information indicating a collision between the second player character and the object to the other video game devices via the communications device;
the first program causes the processor in the first video game device to further perform:
a second player character information receiving step to receive the second player character information from the second video game device via the communications device;
a second player character synchronization step to control the second player character in the virtual game world represented by the first video game device based on the second player character information; and
a collision information receiving step to receive the collision information from the second video game device via the communications device; and
the second player character synchronization step of the first video game device shows the second player character and the object colliding with each other in the virtual game world represented by the first video game device based on the collision information.

9. A non-transitory storage medium storing a video game program to be executed by a computer of each of a plurality of video game devices connected together so that the video game devices can communicate with one another, wherein the video game devices display the same virtual game world while being synchronized together, the virtual game world including therein player characters each controlled by one of the video game devices, the video game program causing the computer to perform:
- a object initial information production step to produce object initial information used for introducing an object, different from a subject player character, into the virtual game world and for controlling the object in the virtual game world, in response to a predetermined input operation by the player;
- an object operation controlling step to control the object according to a predetermined rule after introducing the object into the virtual game world based on the object initial information produced by the object initial information production step;
- an object information transmitting step to transmit the object initial information to the other video game devices; and
- an object information receiving step to receive the object initial information from one of the other video game devices in response to a predetermined input operation by a player of the one of the other video game devices,
- wherein when the object initial information is received from the one of the other video game devices, the object operation controlling step introduces an object into the virtual game world and then controls the object in the virtual game world according to a predetermined rule executed by the one of the other video game devices after the first video game device introduces the object into the virtual game world, and wherein the predetermined rule at least determines the movement of the object based on an initial object position included in the object initial information.

10. The non-transitory storage medium storing a video game program of claim 9, wherein:
- the object initial information transmitted from one of the other video game devices includes introduction time information indicating a time at which the object is introduced into the virtual game world in the one of the other video game devices; and
- when the object initial information is received from the one of the other video game devices, the object operation controlling step calculates a delay time of the virtual game world represented by the subject device with respect to the virtual game world represented by the one of the other video game devices based on the introduction time information included in the object initial information, and determines a position at which the object is to be introduced into, and controlled in, the virtual game world according to the delay time.

11. The non-transitory storage medium storing a video game program of claim 10, wherein when the object initial information is received from the one of the other video game devices, the object operation controlling step introduces the object based on a position of the non-subject player character controlled by the non-subject player character synchronization step in the virtual game world.

12. The non-transitory storage medium storing a video game program of claim 11, wherein:
- the object initial information transmitted from the one of the other video game devices further includes position information representing a position at which the object is introduced into the virtual game world; and
- the object operation controlling step repeats updating the position of the object using the object initial information received from the one of the other video game devices so as to introduce the object at a position closest to the non-subject player character controlled by the non-subject player character synchronization step.

13. The non-transitory storage medium storing a video game program of claim 11, wherein:
- the object initial information transmitted from the one of the other video game devices further includes position information representing a position at which the object is introduced into the virtual game world; and
- when the object initial information is received from the one of the other video game devices, the object operation controlling step calculates a travel time required for moving the object from a position in the virtual game world represented by the position information included in the object initial information to the position at which the object is introduced, and updates the delay time by subtracting the travel time from the delay time.

14. The non-transitory storage medium storing a video game program of claim 9, wherein:
- where the object is introduced into the virtual game world in response to a predetermined input operation by a player on a subject device,
- when a distance between the non-subject player character and the object becomes within a predetermined range, the object operation controlling step determines the non-subject player character to be a target object of the object, and controls the object so as to follow the non-subject player character; and
- the object information transmitting step transmits target information indicating the target object of the object to other video game devices; and
- where the object is introduced into the virtual game world in response to a predetermined input operation by a player on one of the other video game devices,
- the object information receiving step receives target information indicating that the target object is determined by the one of the other video game devices; and
- the object operation controlling step controls the object so as to follow a player character that is specified as the target object by the target information in the virtual game world based on the target information received from the one of the other video game devices.

15. The non-transitory storage medium storing a video game program of claim 14, wherein:
- when the target object specified by the target information transmitted from the one of the other video game devices is the subject player character, the object operation controlling step controls the object so as to follow the subject player character at a first speed;
- when the target object determined by the subject device is the non-subject player character, the object operation controlling step controls the object to follow the non-subject player character at a second speed being lower than the first speed.

16. The non-trasitory storage medium storing a video game program of claim 9, wherein:
- the video game program causes the computer to further perform:
- a collision detection step to detect, only for the subject player character, a collision with the object in the virtual game world;

a collision information transmitting step to transmit collision information indicating a collision between the subject player character and the object to the other video game devices; and a collision information receiving step to receive the collision information indicating a collision between the non-subject player character and the object from one of the other video game devices; and the non-subject player character synchronization includes showing the non-subject player character and the object colliding with each other in the virtual game world based on the collision information received from the one of the other video game devices.

17. The video game system of claim 1 wherein:
the first video game device further performs:
   a first player character operation controlling step to control the first player character in the virtual game world in response to a player's input operation;
   a first player character information transmitting step transmitting first player character information regarding an operation of the first player character to the other video game devices via the communications device at regular intervals, and
the second video game device further performs:
   a first player character information receiving step receiving the first player character information from the first video game device via the communications device, and
   first player character synchronization step to control the first player character in the virtual game world represented by the second video game device based on the first player character information.

18. The non-transitory storage medium of claim 9 wherein the video game program causing the computer further perform:
   a subject player character operation controlling step to control a subject player character in the virtual game world in response to a player's input operation;
   a subject player character information transmitting step to transmit subject player character information regarding an operation of the subject player character to the other video game devices at regular intervals;
   a non-subject player character information receiving step to receive non-subject player character information regarding an operation of non-subject player character controlled by one of the other video game devices from the one of the other video game devices at regular intervals, and
   a non-subject player character synchronization step to control the non-subject player character in the virtual game world based on the non-subject player character information.

19. A method performed using at least a first video device and a second video device communicating with the first video device, wherein each video device displays images of a virtual world being displayed through images on the other video device and the virtual world includes player characters each controlled by one of the video devices;

the first video device includes:
   a communications unit that exchanges data with the second video device;
   a processor executing a first program stored in a non-transitory memory of the first video device, the first program causes the first video device to:
      generate object initial information to be applied to introduce and initially position an object in the virtual world in response to a predetermined input operation performed by the player on the first video device, wherein the object is different from a first player character;
      control the object according to a predetermined rule after the object is initially positioned the virtual world based on the object initial information; and
      transmit the object initial information to the second video device via the communications unit in the first video device; and
the second video device includes:
   a communications unit exchanging data with the first video device;
   a processor executing a second program stored in a non-transitory memory of the second video device, the second program causing the second video device to:
      receive the object initial information from the first video device via the communications unit in the second video device; and
      control the object according to the predetermined rule wherein the object is represented and initially positioned in the virtual world based on the object initial information and the predetermined rule determines the movement of the object.

20. A method to play a video game on video devices communicating with each other to display images of a same virtual game world that includes player characters each controlled by one of the video devices, wherein each video device:
   generates first object initial information to be used to introduce a first virtual object, different from the player character controlled by the video device, into the virtual game world and control the first object in response to a predetermined input operation by the player using the video device;
   control the first object according to a first predetermined rule after introducing the object into the virtual game world based on the first object initial information;
   transmit the first object initial information to another one of the video devices;
   receive a second object initial information generated by another one of the video game devices in response to a predetermined input operation by a player of the another one of the other video devices:
   in response to the reception of the second object initial information introduce a second an object corresponding to the received second object initial information in the virtual game world, and
   moving, in the virtual game world, the second object based on a second predetermined rule.

* * * * *